United States Patent
Luciano

(10) Patent No.: US 12,242,494 B2
(45) Date of Patent: Mar. 4, 2025

(54) DISTRIBUTED DATASTORES WITH STATE-BASED DATA LOCATION

(71) Applicant: Charles J. Luciano, Arvada, CO (US)

(72) Inventor: Charles J. Luciano, Arvada, CO (US)

( * ) Notice: Subject to any disclaimer, the term of this patent is extended or adjusted under 35 U.S.C. 154(b) by 0 days.

(21) Appl. No.: 18/148,251

(22) Filed: Dec. 29, 2022

(65) Prior Publication Data

US 2023/0205776 A1    Jun. 29, 2023

Related U.S. Application Data

(60) Provisional application No. 63/294,626, filed on Dec. 29, 2021.

(51) Int. Cl.
*G06F 16/2458* (2019.01)
*G06F 16/2455* (2019.01)

(52) U.S. Cl.
CPC .... *G06F 16/2471* (2019.01); *G06F 16/24564* (2019.01)

(58) Field of Classification Search
CPC ............... G06F 16/2471; G06F 16/24564
See application file for complete search history.

(56) References Cited

U.S. PATENT DOCUMENTS 11,074,196 B1    7/2021    Aleti et al.
2021/0117232 A1    4/2021    Sriharsha et al.

FOREIGN PATENT DOCUMENTS

WO    WO-2016044763 A1 *    3/2016    ............ G06F 16/21

OTHER PUBLICATIONS

Search Report and Written Opinion Issued in PCT Application No. PCT/US22/54280, Apr. 12, 2023.

* cited by examiner

*Primary Examiner* — Hosain T Alam
*Assistant Examiner* — Anthony G Gemignani
(74) *Attorney, Agent, or Firm* — Holzer Patel Drennan

(57) ABSTRACT

A method of operating on a data unit stored in a distributed datastore system is provided. The method includes determining, based on a data operation request specifying data stored in the distributed datastore system, a data unit identifier associated with the specified data; retrieving system state data representing a state of the distributed datastore system at a time associated with an initial generation of the data unit identifier; determining, based on the data operation request and the system state data, a distributed datastore satisfying a predefined datastore condition, wherein the predefined datastore condition is based on availability of the distributed datastore to store the data at the first time; and transmitting a query to the distributed datastore to determine whether a data unit generated from the data is stored on the distributed datastore, based on satisfaction of the predefined datastore condition by the distributed datastore.

20 Claims, 9 Drawing Sheets

DISTRIBUTED DATASTORES WITH STATE-BASED DATA LOCATION

CROSS-REFERENCE TO RELATED APPLICATIONS

This application claims a benefit of priority to U.S. Provisional Patent Application No. 63/294,626, entitled "DISTRIBUTED DATASTORES WITH STATE-BASED DATA LOCATION" and filed on Dec. 29, 2021, which is specifically incorporated by reference for all that it discloses and teaches.

BACKGROUND

Services access distributed datastores (DDs) to write/create, read, modify, or delete data. Services can be serviced by any number of distributed datastore storage devices (DDSDs) via a core control component and/or other core datastore components that direct the inquiries to an appropriate DDSD. Processing all of the requests at the datastore can create significant overhead at the core control component, which can prevent or limit scaling to incorporate further services and/or DDSDs and affect performance. Further, channeling all communications through a core control component and/or other core datastore components can limit the security of the data transmitted and/or complicate security efforts if multiple services owned or controlled by different entities are using a common core control component to direct tasks for the DSDs. Further still, controllers storing a list of stored retrievable data objects creates a central point of failure and a central point of vulnerability for malicious attacks.

SUMMARY

The described technology operates on a data unit stored in a distributed datastore system by determining, based on a data operation request specifying data stored in the distributed datastore system, a data unit identifier associated with the specified data, retrieving system state data representing a state of the distributed datastore system at a time associated with an initial generation of the data unit identifier, determining, based on the data operation request and the system state data, a distributed datastore satisfying a predefined datastore condition, wherein the predefined datastore condition is based on the availability of the distributed datastore to store the data at the first time, and transmitting a query to the distributed datastore to determine whether a data unit generated from the data is stored on the distributed datastore, based on the satisfaction of the predefined datastore condition by the distributed datastore.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTION

Figure 1:
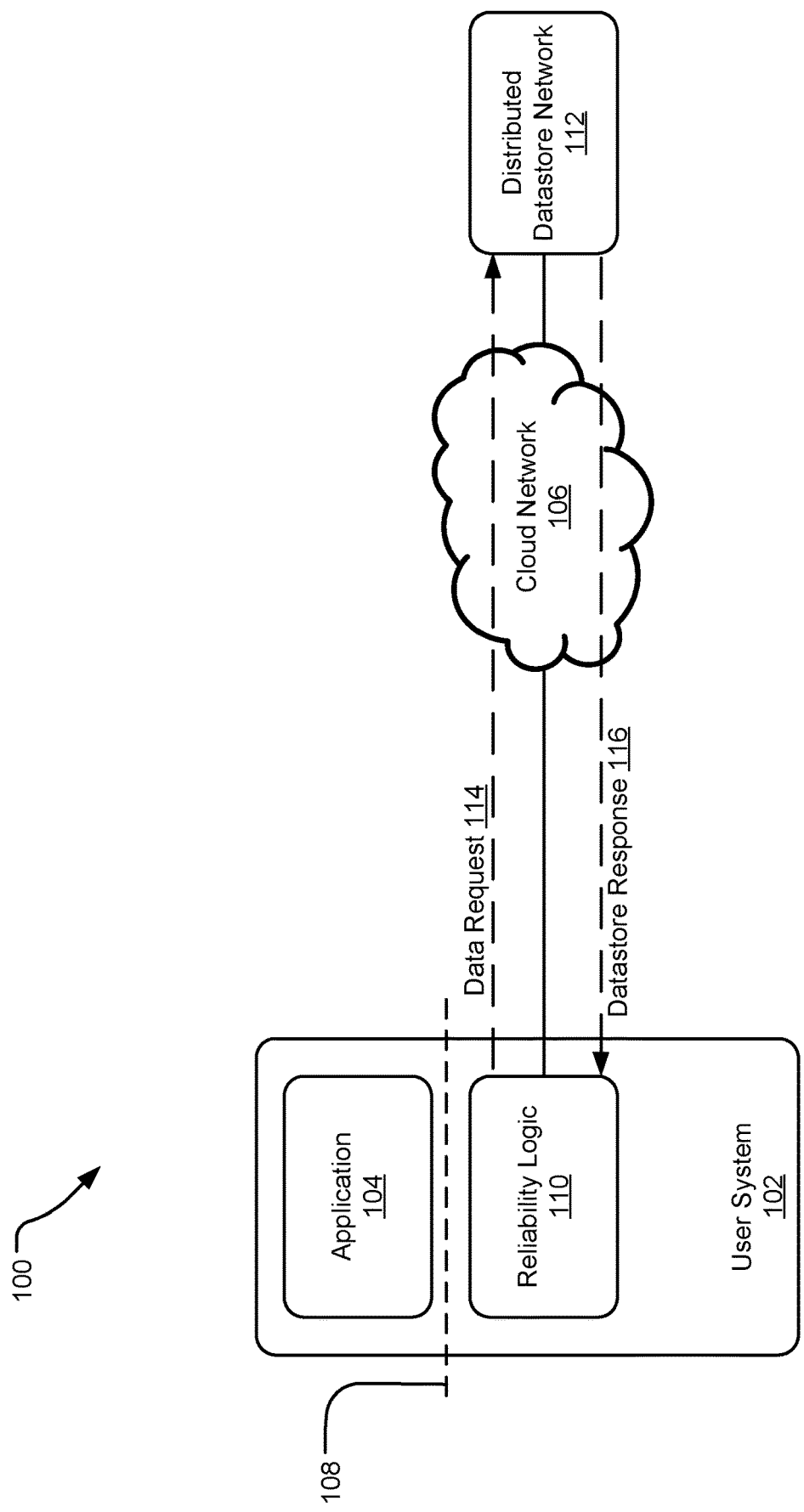
FIG. 1 illustrates an example state-based distributed datastore system.

In implementations, core datastore components may receive, process, and respond to every storage request issued by Services and Applications. The processing the core datastore components execute may include implementing the algorithms and other logic to ensure the data is protected in accordance with service-level agreements (SLAs) and service-level objectives (SLOs) for each Service and Application using the data store. Modifying stored data in datastores can involve executing substantial processing. In addition to processing for data protection and database accesses and updates, the core components may be configured to send all storage requests to the DSDs, handle any error conditions resulting from those requests, return all confirmations and/or error indications to the Services issuing the storage requests, and return all data units to the Services and/or Applications that requested them. Further, the volume of requests can overload I/O buffers and networking resources. These concerns are amplified and compounded when the storage system and associated requests are scaled up.

When a particular resource or set of resources becomes overloaded, a data store of a storage system may become overloaded and become a bottleneck for the entire storage system. Such overloads reduce system performance and limit the ability of the storage system to scale. When an overload on core datastore components becomes severe, the data store itself acts as a failure domain for many or all data-storage operations used by the services, applications, and/or end users.

The data store can fail for reasons other than excessive loads on resources used by the core datastore components. Such reasons include but are not limited to failures of networking and other communications links, failures of primary and backup power sources, and natural and man-made disasters impacting the data store's physical location. When a datastore implementation fails or becomes otherwise unavailable, Services using the data store may no longer be able to operate successfully on data objects if the datastore is not distributed. As a result, any Service that is dependent on the datastore in order to continue successfully operating will experience an interruption of service. When a Service fails or becomes unavailable, End Users and Applications dependent on that Service may experience service interruptions as well. For some End Users and Applications, this will result in an unrecoverable loss of data, some of which may be irreplaceable. Examples of such Services include but are not limited to scientific Services that collect astronomical, weather, or other data from nature in real-time.

In implementations, the data store ensures each data unit is preserved with the level of data protection specified by the SLAs and SLOs applicable to each service, application, and end-user using the storage system. The logic in the data store can ensure, among other things, that each data unit is stored with the specified level of data availability and data resilience. The core datastore components may perform the data-protection logic for data units being written. When computing resources become overloaded, the data store itself becomes overloaded and a bottleneck. Such overloads reduce system performance and limit the ability of the data-storage system to scale. When the number of storage requests increases, the number of database access requests will also increase.

Various techniques can be used to try to reduce or eliminate the performance and scalability limitations the data-unit database places on the data store. These include adding additional indexes to speed up queries and redesigning and reloading the database. These techniques also include keeping commonly accessed information cached in memory. The performance benefits of caching, however, can be substantially less when the storage system is state-dependent. Data-unit database information cached in memory can quickly become out of date and thus useless when a second process performs a write on the same information the first process has cached in memory. Maintaining consistency in a state-dependent storage system can lessen the effectiveness of caching. In implementations, a provider of a popular Service may continue to add instances of that Service to handle increasing demand for the Service and system load. As the number of Service instances grows, however, so does the number of storage requests. Eventually, a database supporting an increasing number of Services and their storage requests can become unable to respond to query requests with low latency.

When storage-related database requests are being issued faster than the database can receive, process, and respond to the requests, the database becomes a bottleneck for the storage system. Services begin receiving error indications and experiencing request timeouts. Eventually, one or more components of the storage system become overloaded and fail due to resource exhaustion. Further, large databases can require nearly constant maintenance, including regular redesigning and re-tuning, by highly experienced database administrators. This can be an expensive and time-consuming process that causes degradation or outages of the storage system. Redesigning and re-tuning may not be relevant to some off-the-shelf products, and it may be more applicable in product development contexts.

Although the number of instances of the Service may theoretically be increased without limit to handle increased demand and requests from End-Users and Applications, the data-unit database in implementations that rely on core datastore components to conduct data transactions provides one limit on the ability to scale these systems and still ensure adequate performance.

In order to maintain performance and scalability, many implementations that rely on core datastore components to conduct data transactions may need to perform regular operations to rebalance and/or defragment the load on core storage system components. For example, if a Service or set of Services stores one million data units and, in the course of their operations, eventually deletes a portion of those data units, the remaining data units may be distributed in a manner that causes unnecessary performance inefficiencies and degradations. Systems may "rebalance" the distribution of the data units in order to correct this. In general, the longer rebalancing is delayed, the more performance is degraded.

During rebalancing, the performance the data store provides to the Services and Applications is degraded. In order to reduce the impact on performance, rebalancing is often performed during times of off-peak system usage. The rebalancing may nevertheless degrade the performance the storage system provides to End-Users, Applications, and Services during these off-peak rebalancing operations.

Further, some systems—including but not limited to those that provide Services to a global user base—do not have any natural off-peak times. In such instances, rebalancing can have an even greater impact on the End Users, Applications, and Services using the data store.

The presently described technology provides a state-based distributed datastore system that operates on (e.g., stores, retrieves, deletes, or otherwise modifies) data units for storage. In implementations, distributed datastores (DDs) identify stored data units (e.g., data objects or data object shards) using system state data representing the state of the distributed datastore system at the time a request is received to store the data object and/or at a later time when the accessible storage in the network is modified.

In an implementation, the distributed datastore system includes reliability logic configured to receive or retrieve system state data from a core controller. The core controller includes a state monitor that monitors the state of distributed datastores and/or distributed datastore storage devices (DDSDs) in the distributed datastore system to generate the system state data. The current system state data at any given time is retrievable from the core controller, as is historical state data from previous intervals. Examples of system state data include the health of DDSDs (e.g., whether errors have been detected or accessibility) in a DD, the type of DDSDs (size, read/write speed, buffer size, buffer speed, i/o bandwidth, etc.) in a DD, the lifecycle of DDs or their DDSDs (e.g., scheduled to be replaced), and the like. The reliability logic uses one or more of an application-side identifier (ASID) of the data unit, the current state data, or an ordering metric (e.g., a timestamp or other sequential metric) as input to an algorithm to generate one or more data-unit identifiers (DUIDs) that correspond to the ASID and/or the data object. The DDs use the DUIDs to index and reference the data objects stored in DDSDs.

In an implementation, a storage request includes a path (e.g., a file system path or another data pointer) to the data object in a user's computing system. The reliability logic may use the path as an ASID or may generate an ASID corresponding to the file path. The reliability logic receives or generates an ordering metric corresponding to the time of the request. The ordering metric is used to reference the current system state data. The reliability logic may request current system state data from a core controller of the DD storage system. Based on the current system state data, the ordering metric, and/or the ASID, the DUID is generated. The request or a user profile may further include a data policy representing a policy for how to handle the stored data. The data policy can include instructions dictating how the DUID is generated and how the DDs handle the stored data unit(s) corresponding to the data object in the request when stored in the DDs. When storing the data units, the reliability logic issues metadata that includes an operating policy (e.g., as determined by the data policy associated with the data stored or to be stored) specific to the data unit.

In an implementation, in a request to operate on a stored data unit, the requesting application provides the ASID and the ordering metric used to generate the DUID of the stored data unit. The ordering metric is then used to retrieve historical system state data from the time at which the original request was made to store the data or from a time at which the DUID and ordering metric were subsequently updated to account for changes in DDSD accessibility.

Based on the historical system state data, the reliability logic determines one or more likely DDs and/or DDSDs in which the data unit is stored. The reliability logic then issues the request for the corresponding data unit to the one or more likely DDs or DDSDs based on the data policy. If the request yields that the data unit is not stored in the first DD or DDSD, the reliability logic requests from the next-most likely DD or DDSD based on the data policy.

In an implementation, when a storage request is made from an application for data to be first stored in a DDSD, the reliability logic may generate a plurality of data units together representing the data to be stored. For example, the more than one data unit may be error-correction coded forms of the data usable as part of an error correction code (ECC) scheme that can provide regeneration or reconstruction of any particular data unit from fewer than all of the more than one data unit. The data units may each be assigned a different, unique DUID (among the DUIDs in the distributed datastore system) by the reliability logic when the reliability logic generates the data unit. In an implementation, the reliability logic generates metadata specifically for each data unit to be stored with each data unit. The metadata may include state data (representing the state of the data unit in storage), an operating policy based on the data policy used to generate the data units and the metadata, and/or identifying data.

A data visitor is a specialized data structure that accesses the metadata and operates on the associated data unit based on the operating policy. The accessing and/or the operation may be referred to as visiting. The operating policy can include preconfigured operations that the data visitor accesses to operate on the data unit. The data visitor may use an index of references to the data units in a DD or DDSD (e.g., DUIDs or local references referenceable internally within the DD or DDSD) in which the data unit is stored to jump from one data unit to the next in sequence. The data visitor may consistently and/or repeatedly go sequentially and repeatedly through the index of the references to the data units to effectuate behaviors of the corresponding data units.

Implementations are contemplated in which no element of the distributed datastore system has a complete index of the data units stored in the distributed datastore system. Further, in some implementations, if the local DDSD or DD has an index that includes local references to the data units instead of the DUIDs, there may be no listing of the DUIDs locally within the DDs or DDSDs, globally throughout the entire distributed datastore system, or anywhere else.

FIG. 1 illustrates an example distributed datastore system 100 ("system"). The distributed datastore system 100 includes an application 104 executable from a user system 102. The application 104 is configured to generate requests to store data or operate on data stored in a distributed datastore network 112. The user system 102 is a computing device (e.g., a personal computer or a business entity computer or server). The distributed datastore network 112 is a cloud computing environment or another server system configured to store data for the user system 102. The application 104 is any type of executable application on the computing device. The reliability logic 110 operates as an interface for communications between the application 104 and the distributed datastore network 112. The reliability logic 110 operates to transmit a data request 114 to the distributed datastore network 112. The data request 114 may be a request to store (e.g., a storage request) or operate on stored data (e.g., a data operation request). Examples of a data operation request include manipulating, deleting, or otherwise modifying data stored or to be stored in the distributed datastore network 112. In implementations, the distributed datastore network 112 provides a datastore response 116, responsive to the data request 114. The datastore response 116 may include a confirmation that data has been stored or modified or may include data retrieved from the distributed datastore network 112.

In the illustrated implementation, the data request 114, the datastore response 116, or any other communications between the reliability logic and the distributed datastore network 112 are conducted over a cloud network 106. Implementations are contemplated in which communications between the reliability logic 110 and the distributed datastore network 112 are communicated over different network solutions. For example, the reliability logic 110 could be collocated with the distributed datastore network 112 in communication over a local network.

In implementations, the application 104 and the reliability logic 110 are separate elements, as illustrated by the dashed line 108. For example, the application 104 may be one of a plurality of applications that use the reliability logic 110 to store, modify, and/or retrieve data. In an implementation, the reliability logic 110 may generate an application-side namespace accessible to the application 104 (and or one or more other applications running on the user system 102) and a storage-side namespace accessible to the distributed datastore network 112. The application 104 may access the application side of the distributed datastore system 100 and the application-side namespace the application 104 shares with the reliability logic 110. The distributed datastore network 112 may access the storage side of the distributed datastore system 100 and the storage-side namespace the distributed datastore network 112 shares with the reliability logic 110. The reliability logic 110 operates as an interface between the storage side and the application side.

The distributed datastore system 100 may operate to store specified data as one or more data units to DDs based on system state data representing the state of the distributed datastore system 100 at a first time associated with the storage request. The reliability logic 110 determines, based on the system state data, at least one DD in the distributed datastore network 112 and/or based on a data policy, where to store at least one data unit representing the data in the at least one DD. The at least one DD may be listed in a roster or index. If the storage operation for a data unit fails in one of the at least one DD in the roster, the reliability logic 110 may store the data unit in another of the at least one DD. The application 104 may generate a data operation request to retrieve or otherwise operate on the specified data. The reliability logic 110 may take data from the data operation request and redetermine the at least one DD in the roster based on the system state data at the first time to "guess" on which DD the at least one data unit representing the specified is stored. The reliability logic 110 issues the guess requests to determine the presence of the data units in the at least one DD until the at least one DD are exhausted. While the system guesses in which DDs the data is located, rather than direct addressing, the guessing allows for better scalability of and better security of the data units stored in the distributed datastore network 112.

In implementations, the application 104 generates a data request 114, including a data operation request specifying data to be operated on in the distributed datastore network 112. The reliability logic 110 determines, based on the data operation request, a data unit identifier associated with the specified data in the distributed datastore system 100. The determination of the data unit identifier may include accessing a value of an ordering metric representing a first time associated with the storage of the specified data and regenerating the data unit identifier based on the accessed value of the ordering metric. The reliability logic 110 then retrieves the first system state data representing a state of the distributed datastore network 112 (and/or the distributed datastore system 100) at a first time associated with an initial generation of the data unit identifier (DUID). The reliability logic 110 then determines, based on the data operation request and the first system state data, at least one distributed datastore satisfying a predefined datastore condition. The predefined datastore condition is based on the availability of the at least one distributed datastore to store the specified data at the first time. In an implementation, the predefined datastore condition is based on whether a DD complies with a data policy. In implementations, the DD complies with the data policy by satisfying a data operation performance requirement.

Figure 2:
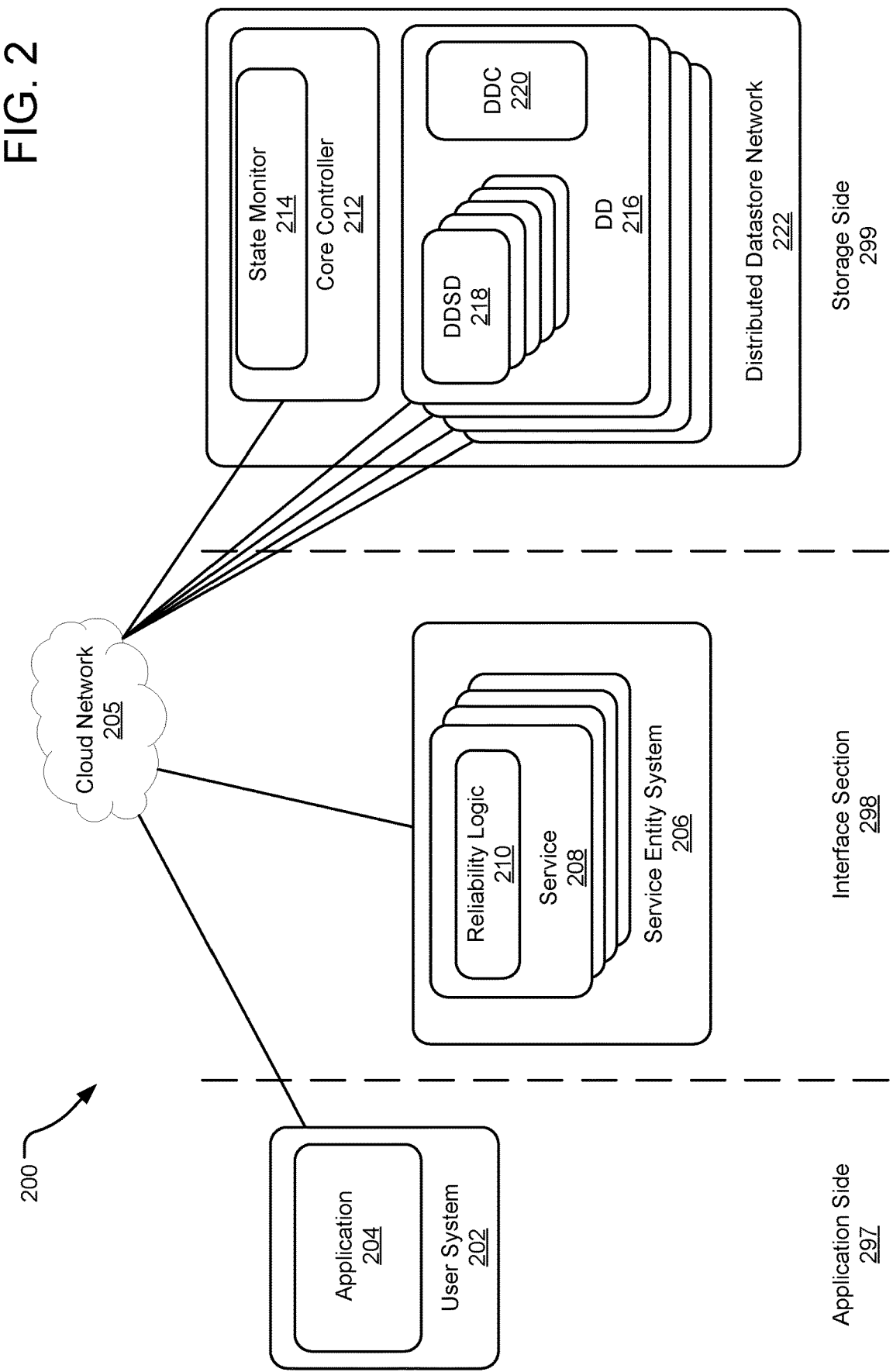
FIG. 2 illustrates a system view of an example distributed datastore system.

A data operation performance requirement may be based on whether data transfer latency, DD geography, data redundancy, data encoding, data resilience, or data encryption satisfy a predefined threshold or a predefined requirement. With respect to the data transfer latency, a DD complies with a data policy if the measured data latency with respect to data transfers between the user system 102, the reliability logic 110 (e.g., if in a system other than the user system 102, such as a service as illustrated in FIG. 2), the cloud network 106, the DD, and/or the distributed datastore network 112 satisfies a predefined transfer data latency threshold or falls within a predefined data latency range. Further, any of the DD geography, data redundancy, data encoding, or data encryption can affect data transfer latency and can be considered with respect to the data latency as predefined conditions affecting the latency. With respect to DD geography, a DD complies with the data policy if the DD is located in a region that is within a geographic location specified as a user requirement, such as within a geographic location that satisfies a legal requirement of the work conducted by the user and/or an operator of the distributed datastore network 112, within a geographic location that is limited by a subscription of the user to use data storage service. With respect to data redundancy, a DD complies with the data policy if the DD, for example, if the DD has multiple DDSDs that satisfy a requirement, such that a redundant copy of a data unit can be stored in different DDSDs within the DD. With respect to data encoding, a DD complies with a data policy, for example, by providing a controller or DDSD that is capable of handling decoding and/or encoding a data unit for modification within the DD or for provision in an encoded or decoded form to a different DD, to the application 104, or to the reliability logic 110. With respect to data resilience, a DD complies with a data policy, for example, by providing DDs and/or DDSDs that do not share a common point of failure (e.g., a common hardware or software resource). For example, the data resilience compliance with the data policy may be based on distributing data units generated from data to be stored to DDs that do not share hardware or software resources or to be stored in different DDs (e.g., because a single DD shares resources). With respect to data encryption, a DD complies with a data policy, for example, by providing as controller or DDSD that is capable of handling encryption or decryption of a data unit for modification within the DD or for provision in an encrypted or decrypted form to a different DD, to the application 104, or to the reliability logic 110. The data policy may also require that the data be exchanged securely, for example, using a trusted platform module, a secure shell, or a secure kernel. Other operation performance requirements may be based on one or more criteria, including but not limited to performance characteristics (e.g., favoring denser storage as older equipment is replaced with newer equipment), space available in certain hardware, hardware in a DD (e.g., a graphics processing unit that allows greater parallel processing), current load (e.g., input/output operations per second or throughput relative to predefined thresholds), or ownership (e.g., in a corporate sense, belonging to a certain department such as accounting or engineering). In an implementation, the data policy may be application specific for data units stored on behalf of and/or for use by the application 104 (e.g., that are not applied to data units stored on behalf of and/or for use by another application).

Alternatively, the DUIDs of the data units stored in the distributed datastore network 112 may have changed since the first time, and the reliability logic uses a second time after the first time representing a time at which a different DUD was generated representing the data unit. The reliability logic 110 then transmits a query to the at least one distributed datastore to determine whether a data unit generated from the specified data is stored on the at least one distributed datastore based on the satisfaction of the predefined datastore condition by the at least one distributed datastore. The data unit generated from the specified data may be a copy, encoding, and/or duplication of the specified data.

In another implementation, the application 104 generates a data request 114, including a data storage request. The reliability logic 110, based in part on the data storage request, initially generates the DUID based on an ordering metric representing the first time. The reliability logic 110 may then determine, based on the initial satisfaction of the predefined datastore condition, the at least one distributed datastore for the storage of the data specified in the storage request. The reliability logic 110 may then transmit the specified data to be stored to the at least one distributed datastore. The reliability logic 110 may further transmit the generated DUID to be stored in association with the data unit associated with the DUID. The reliability logic 110 may service the data operation request in response to the data storage request. That is, the data operation request may be a request to operate on data stored based on the data storage request.

The application 104 may use an application-side identifier (ASID) generated by the reliability logic 110 as an element of a data request 114 (e.g., a storage request or data operation request) to identify in the application-side namespace data stored or to be stored in the distributed datastore network. For example, in response to a storage request, the reliability logic 110 may generate the ASID identifying the data specified to be stored within the application-side namespace. The reliability logic 110 may provide the ASID to the application 104 for the application 104 to make a request from the reliability logic 110 to operate on data. The application 104 may include the ASID in a data operation request submitted at a later time. In an implementation, the ASID is or includes a path to the data stored or to be stored within the application-side namespace. In implementations, the ASID and/or a value of an ordering metric associated with a time of a storage request or a time of generation of a new data unit identifier identifying a data unit generated from the specified data are stored locally on the user system 102. The ASID and/or the value of the ordering metric may be stored in the application or in a database on the user system 102 generated based on instructions from the reliability logic 110. Implementations are contemplated in which the ASID and/or the value of the ordering metric are stored additionally or alternatively in the reliability logic 110. As illustrated, the reliability logic 110 is stored in the user system 102. Alternative implementations are contemplated where the reliability logic 110 is an element of a third-party storage service (e.g., as illustrated in FIG. 2).

In an implementation, the reliability logic 110 generates the DUID based on input, including the ASID, a value of an ordering metric associated with the time of the storage request, a data policy, and/or state data associated with the time of the storage request. The ordering metric associated with the time of the storage request may be based on the time at which the storage request is submitted, a time at which the reliability logic fetches system state data representing the state of the distributed datastore network 112, or a time during which the DUID associated with a data unit is generated or replaces an existing DUID. The ordering metric can be a timestamp, an iterative counter, or another element that provides relative or absolute timing for the distributed datastore system 100. The value of the ordering metric associates the DUIDs with system state data representing the state of the distributed datastore network 112 at the time the DUIDs are generated.

A data policy is a policy that determines how data is stored in the distributed datastore network 112. The data policy can also be based on a subscription level or a data operation performance requirement (e.g., based on data latency, DD geography, data redundancy, data encoding, or data encryption). For example, a user with a premium subscription may have access to faster storage devices in the distributed datastore network 112. In implementations, the data policy may determine the number of data units to be generated and stored in the distributed datastore network 112 based on the data to be stored. In the simplest implementation, a single data unit generated is a copy of the specified data from a data storage request. In other implementations, the specified data is divided, duplicated, and/or encoded (e.g., in an error correction code scheme) to generate multiple data units representing the specified data and stored in the distributed datastore network 112. In an error correction code (ECC) scheme, the data units generated from the specified data specified in a storage request can reconstruct unavailable data units. For example, the more than one data unit generated from the specified data may include a first unit and a different second unit. The reliability logic 110 can reconstruct the first unit based on the second data unit. In other words, the reliability logic 110 can reconstruct one of the more than one data unit from other of the more than one data unit or fewer than all of the more than one data unit. One example of a data encoding includes an N-plus-M encoding scheme (e.g., one only needs N of the N plus M data units generated from the specified data to regenerate the specified data or to regenerate one of the N plus M data units). Examples of error correction code schemes include block codes (e.g., Reed-Solomon coding, Golay, BCH, multidimensional parity, LDPC codes, Marker codes, Watermark codes, or Hamming codes), convolutional codes (e.g., based on the Viterbi MAP or BCJR algorithms), or parity schemes.

The system state data is data representing the state of the distributed datastores (DDs) and/or distributed datastore storage devices (DDSDs) of the distributed datastore network 112. The system state data is determined at particular intervals or in response to a request, and the system state data is associated with a value of an ordering metric representing the time at which the system state data is generated. The system state data can include available storage space, age, utilization (e.g., number of read/write operations), distance/geography, latency, read/write speeds, buffer space, input/output bandwidth, bus bandwidth, cache size, types of memory, processor capacity, recent traffic, and/or the like of the DDs and/or the DDSDs.

In an implementation, the reliability logic 110 generates the DUID based on a random seed. The reliability logic 110 may generate the random seed based on one or more of the ASID, a value of an ordering metric associated with the time of the storage request, a data policy, or state data associated with the time of the storage request. The reliability logic 110 may store the random seed or may regenerate the random seed each time a data request 114 is made.

The reliability logic 110 utilizes the data policy and the system state data at the time associated with the storage request to identify at least one distributed datastore that satisfies a predefined datastore condition. In an implementation, the predefined datastore condition is based on the system state data representing the state of the distributed datastore network 112 at the time associated with the storage request and/or at a time the current system state data was last generated (e.g., if the system state data is generated at regular intervals, the last generated system state data provided before or concurrent with the time associated with the storage request). In an implementation, the predefined datastore condition is based on whether a DD complies with a data policy (e.g., including whether the DD satisfies a data operation performance requirement). For example, the specified data may be stored in the at least one distributed datastore as more than one data unit, the data unit identifier is one of a plurality of data unit identifiers, and each of the more than one data unit is uniquely associated in memory with a different one of the plurality of data unit identifiers.

In implementations, the reliability logic 110 generates metadata to associate with the data to be stored. In implementations, the metadata may be unique to a generated data unit (e.g., based on the DUID and/or the ordering metric). Examples of elements stored in the metadata include state data of a data unit, an operating policy based on the data policy used to generate the data units and the metadata, and/or identifying data. State data describes the state of the data unit. Each data unit in a DD can operate as a state machine with a data visitor. A data visitor is a specialized data structure that accesses the metadata and operates on the associated data unit based on the operating policy. The accessing and/or the operation may be referred to as visiting.

In an implementation, the application 104 and/or the reliability logic 110 can determine and/or include application-specific metadata in the metadata generated for the data unit. For example, the reliability logic 110 may provide storage services for more than one application and may provide customization for each application.

In an implementation, the data visitor manages the data in the distributed datastore system 100 by first accessing metadata uniquely associated in memory with a data unit stored in the distributed datastore system 100. The metadata may include a state of the data unit and an operating policy. The operating policy includes a plurality of preconfigured operations and is generated for the unit by the reliability logic 110 in association with the storage of the data unit. In this implementation, the reliability logic 110 identifies at least one of the plurality of preconfigured operations to be executed in association with the data unit based on a determination that the state of the data unit satisfies an operation condition specified in the operating policy. In this implementation, the reliability logic executes the identified at least one of the plurality of preconfigured operations. In implementations, the metadata may include application-specific metadata specifically for data units that store data associated with the application 104. The preconfigured operations may include application-specific preconfigured operations that are (e.g., exclusively) included in metadata associated with a data unit stored for the application 104. The application-specific preconfigured operations can include application-specific state data that is only stored in metadata associated with data units generated or consulted on behalf of the application 104.

The data visitor may retrieve the data unit and its associated metadata. The data visitor can read the metadata and determine the state of the data unit. For example, the state data may include data about the interaction between the data unit and the application 104 (e.g., a value of an ordering metric(s) representing a time at which a storage request is made to store a data object from which the data unit is generated or a time at which the reliability logic last modified the DUID), data regarding a position in a sequence of preconfigured operations (e.g., in a multi-preconfigured operation process), or data representing a value of an ordering metric associated with the other data units generated from the data to be stored (e.g., data units with the same ASID). The data representing a value of an ordering metric associated with the other data units generated from the data to be stored can be used to determine when the data units sharing an ASID were last checked to see if they were all accessible. If the data units are not all accounted for as accessible in the distributed datastore system 100, the reliability logic may determine which data unit is missing and regenerate or reconstruct the data unit (e.g., from an error correction code scheme using the remaining retrievable data units).

In an implementation, the operating policy includes preconfigured operations that can be conducted on or on behalf of the stored data unit. Examples of preconfigured operations include migration of, replication of, error checking of, deduplication of, compression of, deletion of, modification of, or contacting an application on behalf of the data unit associated with the metadata. The operating policy and its preconfigured operations may be stored locally in the metadata. The preconfigured operations may be or include references (e.g., pointers) to preconfigured operations stored in the DDs, the DDSDs, in the reliability logic 110 (e.g., as data elements of the data policy used to generate the metadata), or a combination thereof. The operating policy may be based on a subscription of a user (e.g., a business organization or individual) of the user system 102 or one or more preconfigured settings provided by the user. The interaction between the data visitor and data unit and its associated metadata is described with respect to the DD 300 described with regard to FIG. 3.

The identifying data can include one or more of the ASID, a DUID, or a local reference to the data unit within the DD storing the data unit. In an implementation, the ASID is or includes the path to the data stored within the application-side namespace. In an implementation, the DUID includes a path to the data unit within the storage-side namespace. In an implementation, the ASID and DUID are relative and can be translated back and forth with string substitution formulas. The translatability can make storage of both the ASID and DUID in the metadata redundant and allow for one or the other to be stored. Examples of string substitutions include pattern matching or regular expressions. In an implementation, the ASID and DUID may be transmitted with appended prefixes or suffixes representing host names, domain names, that can be interchanged, as in web servers. For example, the DD may be represented by a host name and/or port represented by a prefix or suffix local to the DD, and each DDSD stored within the DD may be represented by a path component (e.g., a portion of a universal resource locator). In an implementation, a portion of the host name is the domain name.

After one or more data units are stored representing the data to be stored (e.g., in association with a single ASID representing the data to be stored in the application-side namespace), the application 104 may generate a data operation request to retrieve or operate on the stored data. The data operation request may include the ASID and/or the value of the ordering metric associated with a time at which the latest DUID for the data units was generated (e.g., at a time the data was stored or at a subsequent time at which the DUIDs for the ASID were updated). Based on the ASID and/or the ordering metric, the DUID(s) for the data unit(s) that represent the data stored in association with the ASID is regenerated. Based on the ordering metric, the data policy, and/or the system state data representing the state of the distributed datastore network at the time associated with the last generation of the DUID(s), the reliability logic determines the at least one DD that satisfy the predefined datastore condition. The reliability logic 110 then issues a request to the at least one DD to determine whether the data units associated with the ASID of the data operation request are stored in the at least one DD. If the data unit(s) are stored in the determined at least one DD, the reliability logic 110 performs the operations via each local controller of the DD or DDSD (e.g., vie a data visitor or directly using storage control protocols of the storage controllers). For example, if the operation is a retrieval operation, the reliability logic 110 retrieves the data unit(s). If more than one data unit represents the stored data, the reliability logic 110 may reassemble the stored data using the more than one data unit (e.g., by assembling the data units and/or decoding an error correction code scheme of the data units).

If the data units are not stored in a first of the determined at least one DD, the reliability logic 110 will consult a next of the at least one DD. In implementations, if one or more data units associated with the ASID are not stored in the determined at least one DD, the reliability logic 110 may request the data unit from one or more DDs other than the determined at least one DD. In implementations in which the DUID includes or is a path to the data unit in the distributed datastore network 112, the reliability logic 110 may use the path in requests to operate on the data unit.

In an implementation, the distributed datastore system 100 includes one or more hardware processors configured to execute instructions in memory. The reliability logic 110 may be executable by the one or more hardware processors and include: a data unit identifier determiner executable by the one or more hardware processors and configured to determine, based on a data operation request specifying data stored in the distributed datastore system, a data unit identifier associated with the specified data in the distributed datastore system; a system state data retriever executable by the one or more hardware processors and configured to retrieve first system state data representing a state of the distributed datastore system at a first time associated with an initial generation of the data unit identifier; a distributed datastore determiner executable by the one or more hardware processors and configured to determine, based on the data operation request and the first system state data, at least one distributed datastore satisfying a predefined datastore condition, wherein the predefined datastore condition is based on availability of the at least one distributed datastore to store the specified data at the first time; and a query transmitter executable by the one or more hardware processors and configured to transmit a first query to the at least one distributed datastore to determine whether the specified data is stored on the at least one distributed datastore, based on the satisfaction of the predefined datastore condition by the at least one distributed datastore. The query transmitter is configured to use communication hardware such as wired or wireless communication transceiver and/or antenna to transmit queries between the reliability logic 110 and one or both of the distributed datastore network 112 and the application 104.

In an implementation, the data unit identifier is further configured to initially generate, based in part on a data storage request, the data unit identifier based at least in part on a value of an ordering metric representing the first time associated with an initial generation of the data unit identifier. In an implementation, the distributed datastore determiner is configured to determine, based on an initial satisfaction of the predefined datastore condition, the at least one distributed datastore for storage of the data. In another implementation, the reliability logic further includes a data transmitter executable by the one or more hardware processors and configured to transmit a data unit representing the specified data to be stored to the at least one distributed datastore. The data transmitter is configured to use communication hardware such as wired or wireless communication to transmit data (e.g., data units and/or associated data unit metadata) between the reliability logic 110 and one or both of the distributed datastore network 112 and the application 104. In an implementation, the data transmitter includes the query transmitter. In an implementation, a data unit identifier determiner is configured to initially generate the data unit identifier by combining input to generate the data unit identifier, wherein the input includes the value of the ordering metric or an application-side identifier an application that generated the data operation request uses to identify the specified data. In an implementation, the predefined datastore condition further includes whether the at least one distributed datastore complies with a data policy. The data policy may include a condition representing whether the at least one distributed datastore satisfies a data operation performance requirement.

In an implementation, the specified data is stored in the at least one distributed datastore as more than one data unit, the data unit identifier is one of a plurality of data unit identifiers, and each of the more than one data unit is uniquely associated in memory with a different one of the plurality of data unit identifiers. In an implementation, the more than one data unit provide for the reconstruction of a first of the more than one data unit based at least on a second of the more than one data unit different from the first of the more than one data unit. In an implementation, the data unit identifier determiner determines the data unit identifier by accessing a value of an ordering metric representing the first time based on the data operation request and regenerating the data unit identifier based on the accessed value of the ordering metric. In an implementation, the reliability logic 110 further includes a datastore availability determiner executable by the one or more hardware processors and configured to determine, based on system state data associated with a value of an ordering metric, that availability of datastores in the distributed datastore system satisfies an availability change condition, the ordering metric representing a second time later than the first time; the data unit identifier determiner further generates, based on the value of the ordering metric, a second data unit identifier, responsive to the satisfaction of the availability change condition; and the data transmitter is further configured to transmit an instruction to associate in memory the specified data with the second data unit identifier.

In an implementation, the data unit identifier determiner determines the data unit identifier by determining that the at least one distributed datastore does not store a data unit associated with the data unit identifier and transmitting, by the query transmitter, a second query, based on the data unit identifier, to an active distributed datastore other than the at least one distributed datastore in the distributed datastore system to determine whether the data unit is stored on the active distributed datastore. An active distributed datastore is a DD that is in active communication with and available for storage in the distributed datastore network 112. In an implementation, the reliability logic 110 includes a state data receiver in hardware or executable by the one or more hardware processors to receive the first system state data associated with the value of the ordering metric from a core controller of the distributed datastore system, wherein the core controller is operable to receive and collect system state data from each distributed datastore in the distributed datastore system. In an implementation, the data transmitter is further configured to transmit the data unit identifier to be stored in association with the specified data.

FIG. 2 illustrates an example distributed datastore system 200. The system includes a user system 202 that executes an application 204. The application 204 may communicate with a service entity system 206. The service entity system 206 includes a service 208. The service 208 includes an instance of the reliability logic 210 (e.g., availability and/or resilience logic). As illustrated, service 208 may be one of a plurality of services in the service entity system 206. The distributed datastore system 200 differs from the distributed datastore system 100 of FIG. 1 in that the reliability logic is provided by a service 208 of a service entity system 206 rather than an element stored on the user system 202. Otherwise, elements of the distributed datastore system 200 are implementations of the like-named elements of the distributed datastore system 100 of FIG. 1.

The application 204 may transmit requests to the service 208 over a cloud network 205. The request may include or otherwise involve an operation on data stored or to be stored in a distributed datastore network 222. Operations on data may include one or more of writing data, reading data, updating data, or deleting data. The request may also include an application-side identifier (ASID) and/or a value of an ordering metric specific to the data. A value of the ordering metric may represent a time associated with the data storage request or at a later time at which a change in the distributed datastore system 200 satisfies an availability change condition (e.g., potentially causing the reliability logic 210 to issue a new DUID associated with a second value of the ordering metric). The ASID identifies the data to be stored. The ASID and/or the ordering metric may be generated by the application 204 or by reliability logic 210. The ASID and/or the ordering metric may be stored locally on the user system 202.

The reliability logic 210 may communicate with elements of a distributed datastore network 222. For example, the reliability logic 210 may communicate with a core controller 212 to receive system state data generated and maintained by a state monitor 214 of the distributed datastore network 222. The distributed datastore network 222 includes a plurality of distributed datastores (DDs). At least one of the DDs, a DD 216, includes a distributed datastore controller (DDC) to control the operations of the DD 216. In an implementation, the DDC 220 may include one or more of a storage networking server, control-data interface logic, and a platform/operating system. The DD 216 also includes a plurality of distributed datastore storage devices (DDSDs), including DDSDs 218. The DD 216 may manage its own array of DDSDs 218 using the DDC 220. As illustrated, the DD 216 may communicate over a separate communicative coupling with the cloud network 205 and, in implementations, may communicate over the cloud network 205 directly, eschewing the core controller 212. The DD 216 may additionally or alternatively communicate with the cloud network 205 over a virtual private network or another private network. While the distributed datastore network 222 is illustrated as a single element, the distributed datastore network 222 may be distributed over a number of locations. Further, in implementations, the DD 216 may be physically distributed over a number of locations.

While illustrated as stored in a service 208 of a service entity system 206, the reliability logic 210 may alternatively or additionally be an element of or element in communication with the application 204. Implementations are also contemplated in which the instance of the reliability logic 210 is an element of a dedicated software or hardware adapter that may be an element of one or more of the application 204, user system 202, service entity system 206, or service 208. Additionally or alternatively, any functionality ascribed in this specification to elements that interact on or between application-side elements such as the application 204 and the user system 202 and interface section elements such as reliability logic 210, service 208, and/or an adapter may be distributed in any manner among the application-side elements and interface section elements in various implementations. The application side 297 is illustrated as delineated by the left dashed line. The application side 297 is illustrated as adjacent to the interface section 298. The interface section 298 is separated from the storage side 299 by the right dashed line. As illustrated in FIG. 1, the interface section 298 may be integrated with the user system 202. Implementations are contemplated in which the reliability logic 210 is stored in a secure area (e.g., a trusted platform module, secure shell, or secure kernel) of the user system 202 or the service 208.

The application 204 may identify and/or catalog data at levels of one or more of files, objects, register addresses, shards, blocks, file directories, file folders, and/or other forms of reference, whether direct or indirect, to data. One or more of the application 204, the reliability logic 210, and/or the service 208 may assign an application-side data identifier (ASID). The ASID may be used by the application 204 and one or more of the service 208 and reliability logic 210 to reference data on which to operate. The ASID may be an element (e.g., a path to the data stored or to be stored) of an application-side namespace or a global namespace and/or may be unique within one or more application-side namespaces usable by one or more application-side elements.

The reliability logic 210 (whether in implementations in which it is an element of service 208 or user system 202) may generate data-unit identifiers (DUIDs) representing data units to be stored by and/or operated on by the DD 216. The DUIDs may represent data associated with an ASID. In an implementation, when a request is made by the application 204 that involves modifying the manner in which data is stored in any of the DDs (e.g., an original write, delete, modification, or otherwise that might cause the distributed datastore system 200 to generate new identifiers), the request may include an ASID and a value of an ordering metric. The ASID and value of the ordering metric specific to the data may be mapped to one or more DUIDs (e.g., if data is redundantly stored or stored as an encoded scheme) shared between the reliability logic 210 and one or more of the DDs, including the DD 216 (e.g., if data is stored on more than one of the DD 216). In implementations, the DUIDs are generated at least partially using one or more of the ASID and the value of the ordering metric. Further requests to access that data from the application 204 may include or reference the ASID and the value of the ordering metric specific to the storage of the data or the data already stored in the DD 216. The reliability logic 210 may operate on the corresponding data stored in one or more of the at least one DD, including the DD 216, using the one or more DUIDs to identify the data unit(s) that correspond to the ASID and the value of the ordering metric in the request. The DUIDs may be elements of a storage-side namespace. The storage-side namespace may be shared among one or more elements that interact on the storage side of data operations (storage-side elements), such as one or more of the distributed datastore network 222, at least one DD, DDSDs 218, DDC 220, or interface elements. Implementations are contemplated in which Each DD or DDSD store and/or index DUIDs (e.g., in a data unit index) associated with data units stored on the DD or DDSD, but has no access to DUIDs stored on other DDs or DDSDs.

Interface section elements may reference data in data transactions with the application-side elements using the application-side namespace (e.g., the ASID and/or the value of the ordering metric). The interface section elements may reference data in data transactions with the storage-side elements using a storage-side namespace. In implementations, the application-side elements do not have access to the storage-side namespace. Implementations are also contemplated in which the storage-side elements do not have access to the application-side namespace, but embodiments are also contemplated in which the ASID is stored in metadata associated with each data unit stored in the storage-side namespace. Implementations are also contemplated in which one or more of the storage-side elements has access to the application-side namespace and/or the application-side elements have access to the storage-side namespace. The interface elements may or may not have an internal reference to relate ASIDs and/or values of ordering metrics with DUIDs associated with a common request made by the application 204. The use of ASIDs and DUIDs may provide a layer of abstraction between the storage side and the application side, which may improve security.

The application-side data may be formatted and/or structured differently from the corresponding storage-side data. For example, the application-side data and the storage-side data may differ in one or more of data format (e.g., block, file, object, compression scheme, or data policy assignment), size (e.g., the data may be divided or aggregated into blocks for provision to the storage side), encoding (e.g., data units may be an error correction code scheme of the data stored), or encryption. Additionally or alternatively, a request may involve operations on data to be conducted at the service 208 such that the data to be retrieved from the storage-side elements is intermediary data that is not to be transmitted to the application 204 but processed by one or more of the reliability logic 210, the service 208, or one or more other DDs.

The core controller 212 includes a state monitor 214 that monitors the state of DDs (e.g., including the DD 216) and/or DDSDs 218 to generate system state data. Examples of system state data include the availability of DDs, the available space within DDs, data storage policies of DDs, space and/or availability of tiers of storage within or among DDs, the health of DDs (e.g., age, number of operations conducted within, or numbers of dead or inactive sectors of DDSDs 218), or the temperatures of DDs (and/or the DDSDs 218). The system state data may be organized using an ordering metric. The system state data may include a plurality of snapshots of the states of DDs organized based on values of the ordering metric. At any given time, there may be current (or most recent) system state data representing the current state of the distributed datastore system 200. An ordering metric may include one or more of time (as in a timestamp) or sequence (e.g., based on an iterative counter). The system state data may be determined or stored at regular time or sequence intervals between state snapshots that may be uniform (e.g., regular intervals) and/or may be triggered by certain events or activity (e.g., a predetermined number of data operations, a report that one or more DDs have changed status, requests for the system state data, or specific changes to the system such as failure of elements). The sequential ordering metric may merely catalog the instance of the generated system state data as a number or other representation in a sequence. The system state data may be transmitted to one or more of the interface section elements and/or other storage-side elements. The transmission of the system state data may be responsive to a request and/or may be transmitted based on the satisfaction of a transmission condition (e.g., trigger based on a preconfigured operation or a lapse of time from a triggering event) stored in the state monitor 214. In implementations, one or more of the interface section elements and the storage-side elements may store the system state data (e.g., as a catalog of snapshots of states of DDs), the data potentially being organized and/or indexed based on values of the ordering metric.

If a request from an application 204 includes or otherwise causes a data storage request, the reliability logic 210 may responsively generate one or more DUID(s), each corresponding to the data unit(s) to be written (e.g., to each copy if the data is replicated for storage or to each shard, parity block, or other portion of data if the data is divided, encoded, or error coded for storage). Implementations are contemplated where the DUID is not stored in the reliability logic but is generated when a request is made by the application 204 (e.g., based on one or more of the ASID, the value of the ordering metric, the data policy for that data unit, or system state data). The DUID may be generated based on one or more of: data identification elements, such as one or more of a value of an ordering metric (e.g., a timestamp corresponding to a time of generation of the data or a relative sequential element that identifies a current snapshot of the system state data included in a request); the data which the DUID will identify (or portions thereof); an ASID (e.g., one included in a request) corresponding to data to be stored in association with the DUID; a roster or other system state data associated with one or more of a specific ordering metric, a data unit's operating policy (e.g., one or more of distribution across more than one of the DDSDs 218 for resilience, replication instances for different instances of a service (for example, at different branches or locations of a retail or other business franchise)), tiered storage based on latency or financial cost, or geographical distribution (for example, to ensure data availability in the event of a localized network outage or widespread natural disaster); current system-wide conditions such as network congestion or storage availability in various DDs; wear leveling (for example, favoring storage in newer one of the DDSDs 218 with less wear); predefined expiration durations for certain data; or policies specific to services not available on all DDs (e.g., data that benefits from or requires certain hardware like a graphics card).

In some implementations, data can be initially transmitted to DDs with specialized hardware for processing that benefits from the hardware (e.g., encoding), and the resulting processed data may then be stored in different DDs without the specialized hardware. The DUID may be cryptographically generated from the data identification elements (e.g., from a random number generated based on seeding using one or more of the identification elements). In an implementation, the DUID may represent a hashed key based on the data identification elements. The DUID may be introduced as an element of a namespace shared among one or more of the interface elements and the storage-side elements. In some implementations, one or more of the core controller 212 and the state monitor 214 may not have access to the storage-side namespace and may further not have access to data stored in the DDSDs 218.

In implementations, the reliability logic 210 may request updated and/or current system state data. Alternatively or additionally, the core controller 212 may provide updated and/or current system state data without any request from the reliability logic 210. The reliability logic 210 may determine at least one DD that satisfies a predefined datastore condition on which to store data identified by the DUID. The determination may be based on one or more of the updated and/or current system state data and a data policy (e.g., one associated with one or more of the reliability logic 210, the data to be stored under the DUID, the application 204, the user system 202, or an entity). The determinations may be made by the reliability logic 210, which can predictably generate a DUID based on one or more of the data identification elements. The determined at least one DD (e.g., including the DD 216) may include more than one DD, potentially presenting alternative options for storage if there is an issue with one of the at least one DD. In an implementation, the determined at least one DD may be ranked based on appropriateness for storage of the data. The appropriateness may be determined based on the satisfaction of a predefined datastore condition, the predefined datastore condition based on one or more of the data identification elements (e.g., the current system state data). Predefined datastore conditions may be based on one or more criteria, including but not limited to performance characteristics (e.g., favoring denser storage as older equipment is replaced with newer equipment), space available in certain hardware, current load (e.g., input/output operations per second or throughput relative to predefined thresholds), or ownership (e.g., in a corporate sense, belonging to a certain department such as accounting or engineering).

At any given time, based on input data identification elements introduced to the reliability logic 210 to generate the DUID, the reliability logic 210 will produce a unique DUID from the input data identification elements. There may be more than one DUID for a data unit if the data unit is mirrored for redundancy or resiliency. The DUID may therefore be unique within the storage-side namespace, even if it is associated with a redundant data unit. However, more than one DUID may correspond to a given set of identifying data in a request. For example, data identified by a single ASID (and/or ordering metric value) may correspond to data stored in one or more DDs having one or more DUIDs. Given differences in inputs and other confounding factors, the DUIDs generated by the service 208 and other services may be unique within a shared storage-side namespace. This uniqueness can be further assured by providing differing hashing or encryption algorithms to each instance of the reliability logic 210 or by encoding the DUIDs based on the content of the data to be stored.

When the DUID is generated and an appropriate destination DD is determined and selected, the data is written to one or more of the DDSDs 218 in the selected DD. The DDC 220 and/or the DD 216 associates the stored data with the generated DUID. In an implementation, the DDC 220 and/or the DD 216 stores the association between the data units and the DUIDs stored in the DD 216 in an index (e.g., a sequential index) or table. For example, the DDC may operate in a file system with the data unit stored as a file, and the file system may include an index of paths that are or that are elements of the DUIDs. In an implementation, the DDC 220 may be responsible for assigning the writing of the data to one or more of the DDSDs 218. The assignment may be based on a data policy, for example, based on a data policy of the data (e.g., requiring a certain latency for access and/or modification) and the current system state data associated with the time of the request to store the data unit. An implementation of a data policy may include whether and/or to what extent the DD 216 satisfies a data operation latency requirement based on the latency of data operations as well as other policies previously discussed. The DDSDs 218 may be of different tiers and/or different types (e.g., a non-volatile memory express device, a hard disk drive, a solid state disk drive, cache, random access memory, or tape drive, digital video disk, etc.) that are configured to handle data that is accessed differently, such as accessed at specific ranges of frequency, accessed at differing recency intervals, or data that has a policy that requires a threshold or range of latency of access. One or more of these different tiers or types of DDSDs 218 may correlate with the greater or lesser relative financial cost for reading, writing, modifying, or deleting data on that tier or type of DDSD. The assignment to the different tiers of storage may be based on the data policy (e.g., a subscription of a user).

In an implementation, after generating the DUID, the reliability logic 210 may store the DUID in an index that is associated with one or more of a request and an ASID from the application 204. In another implementation, the reliability logic 210 may be configured to later parse elements of the DUID to derive system state data to reference a historic datastore state that was a current datastore state when the DUID was initially generated. In still another implementation, the reliability logic 210 regenerates the DUID at every request (e.g., based on identifying data such as a value of an ordering metric and an ASID) such that the DUID is not stored by the reliability logic 210 and/or is not parsed from the DUID.

If the core controller is down or otherwise inaccessible, the most recent or other historical system state data may be used to generate the DUID and/or determine an appropriate DD (e.g., the DD 216) on which to write the data. Because the distributed datastore system 200 is unlikely to change significantly during short time intervals, a prior iteration of system state data represented by a prior value of the ordering metric may closely represent the current state of the distributed datastore system 200. Similarly to the guessing scheme provided by the use of the system state data in retrieving the data units, the use of the ordering metric with state data may closely approximate the state of the data at the time the request is made. The guessing, prediction, or approximation schemes can provide a more scalable and secure system than one in which indirection between the application-side namespace and storage-side namespace is handled by fixed relational paths between the data specified for storage in a storage request on the application side 297 and the corresponding data unit(s) stored in the storage side 299.

The reliability logic 210 may receive a data operation request from the application 204 that includes or involves one or more of a read or modify (e.g., delete or alter) operation of the data represented by the DUID. The request may include an ASID. For example, a request may include an ASID if the operation is a direct operation that operates on one or more corresponding DUIDs (e.g., a direct read request from the application 204). The reliability logic 210 may determine one or more DUIDs that correspond to one or more data unit(s) to be accessed and/or modified based on the request. For example, the DUIDs may not be stored but generated each time the DUIDs are used. The reliability logic 210 may regenerate the DUID for a stored data unit based on one or more of the ASID, ordering metric, or data policy for the stored data unit. Some or all of this data may be transmitted with a request associated with the data unit.

Based on the state of the distributed datastore system 200 at a time represented by the value of the ordering metric from which the DUID was generated and an ASID, the reliability logic 210 may be able to redetermine the same determined at least one DD that was determined when the DUID was originally generated. This redetermination may provide the reliability logic 210 with the at least one DD originally determined for storage.

The reliability logic 210 may then directly request from one or more of the at determined least one DD to operate on the data associated with the DUIDs in accordance with the data operation request from the application 204. If the data identification elements include and/or are generated from a value of an ordering metric (e.g., timestamp or sequence number) that refers to the system state data at the time the data is initially stored, the reliability logic 210 may later reference the ordering metric value in historic system state data representing the state at the time of generation in order to generate or regenerate each DUID and "guess" or predict at which DD the data unit identified by the DUID is stored. If the determined at least one DD is ranked based on the state of the system state data that existed when the DUID was generated and the data policy, the reliability logic 210 may determine and/or rank the at least one distributed datastore that satisfy a predefined datastore condition. The ranking may be based on the data policy and/or other identifying data. The reliability logic may then inquire of the at least one DD in order of the ranking to make the best predictions of which of the at least one DD has stored the data unit corresponding to the DUID. If the data unit is not present in a predicted at least one DD, the reliability logic 210 may proceed to the next highest-ranked of the determined at least one DD to determine whether the data unit is present. If all of the determined at least one DD have been checked, the reliability logic 210 may then request whether the data unit and/or its DUID are stored in active DDs other than the determined at least one DD.

In implementations, when the data units are migrated by a data visitor, the data visitor references and/or redetermines the determined at least one DD to determine where to next migrate the data unit. In so doing, even if the data is migrated to a different of the determined at least one DD, the reliability logic 210 will guess or predict the destination of the migrated data unit based on the system state data associated with the ordering metric from which the DUID of the migrated data unit was generated.

In another implementation, the first predicted at least one DD may alternatively (rather than the reliability logic 210 going to the next highest-ranked DD) or additionally use the DD's own DDC 220 to attempt to determine the location of the data identified by the DUID. This may occur in a number of different circumstances.

In an implementation, the DD may have stored the data identified by the DUID that may subsequently satisfy a data migration condition. The data migration condition may be a threshold or range representing one or more of the frequency of access of the data, the time since the data has been accessed, or a change in data policy associated with the data. The data migration condition may be an element of or associated with the DD and/or its DDC 220. The DD 216 and/or its DDC 220 may determine that the data satisfies the data migration condition, and the data may then be migrated to a different location within the DD 216 or to a different DD. If the data is migrated to a different DD, current or historical state data may be used to predict alternate DD locations where the data may be located. The DD from and/or to which the data is migrated and/or its DDC 220 may store one or more of a reference to a destination DD of the data unit or a record of current and/or historical system state data (and/or its corresponding ordering metric value) used for the data migration to the different DD or may issue a new DUID based on an ordering metric value associated with the time or relative sequential value of data migration. Additionally or alternatively, the predicted DD may later recreate at least one appropriate migration DD and predict where the data was migrated (e.g., similarly to the manner in which the predictions were made to determine the at least one DD for the read or modify request).

In another implementation, the DD 216 may be deficient, such as close to failure or approaching an end of a predetermined use period. The state monitor 214 may recognize this and transmit system state data reflecting the deficiency (or a need to migrate data from the DD 216 determined to be deficient) to the other DDs or the reliability logic 210. Alternative implementations are contemplated in which a data visitor, rather than the state monitor 214, evaluates conditions and performs a data migration. The DD 216 or another DD may provide instructions for the DD 216 to migrate data, including the data identified by the DUID, to the other DD. In this instance, the migration may be noted in data in the destination DD along with the current or historical system state data used for the migration (and/or an ordering metric value corresponding to the time or sequential state position of the migration).

In an implementation, the DD 216 from which the data unit is to be migrated stores metadata regarding the migration. For example, the DDC 220 and/or the data visitor may retain the data unit's metadata, a portion of the data unit's metadata, or other data representing a destination DD or DDSD to which the data unit is migrated. This may allow the DDC 220 to provide the reliability logic 210 with the destination DD as a predicted DD for a data request to access the data unit that has been migrated. In an implementation, data unit migration is controlled by the reliability logic 210 but the transfer of the data unit is conducted directly between DDs. In this implementation, if the reliability logic 210 requests a data unit that has been migrated, the source DD from which the data unit has been migrated may provide the data representing the destination DD to the reliability logic 210 for the reliability logic 210 to make the request for the data unit from the destination DD, or the source DD may make the request from the destination DD.

In response to receiving an inquiry from the reliability logic 210 for data based on the DUID, the DD 216 (and/or is DDC 220) may search a local DD namespace (e.g., a data unit index or table) to determine whether the data unit and/or its associated DUID is present in the local DD namespace.

If the DD 216 stores the data unit associated with the DUID stored and retrievable within the local DD namespace, the DD 216 (e.g., its DDC 220 or controllers within the DDSDs 218) may responsively operate on the data unit in accordance with the data operation request (e.g., read, modify, or erase the data). If the data is modified or read, the data may continue to be associated with the DUID in the storage side 299 and/or local DD namespaces. In the event the data operations include a delete operation, the data may be deleted, and its associated DUID may be removed from the storage-side namespace and/or the local DD namespace. Implementations are contemplated in which the local DD or DDSD namespace (e.g., file system) is isolated relative to (e.g., not shared with) other DDs or DDSDs, such that the data units and/or associated DUIDs in the DD or DDSD are not referenceable or discoverable by other DDs or DDSDs (e.g., except indirectly through the reliability logic 210 via the ASID and/or relevant value of the ordering metric).

If the DD 216 receives a request for a data unit and/or its associated DUID that is not stored on the DD 216, the DD 216 may one or more of return an error to the requestor; locate the data and return the location of the data to the requestor (i.e., perform a redirect); locate the data, retrieve it from the DD on which it is stored, and return the data to the requestor (i.e., act as a proxy); or locate the data, migrate it to itself, and return it to the requestor.

With respect to ownership and control of the elements of user system 202, the service entity system 206, the services 208, the distributed datastore network 222, the core controller 212, or the DDs, any combination of different or same ownership and control is contemplated. For example, one or more of the elements may be multitenant elements. In an implementation, each service 208 is provided by a single entity that controls the service entity system 206 to different client entities operating one or more of the user system 202. In another implementation, a plurality of service entity systems 206 is serviced by one or more of the distributed datastore network 222, with each service 208 provided to a client of the entities in control of a service entity system 206. In implementations, the DDs (including the DD 216), DDSDs 218, or both may be owned or controlled by different entities. Further, the services may share certain storage-side namespaces or may alternatively divide the storage-side namespaces (e.g., by a designation in the DUID) depending on the controller of the services and/or the clients or end-users serviced. In an implementation, as illustrated in FIG. 1, the reliability logic 210 is an interface locally installed to interact with the application 204 and/or other applications in the user system 202.

In an implementation, the reliability logic 210 may map the ASID for the application namespace to one or more DUIDs. In implementations, the DUIDs have a host portion identifying the DD 216. The DUIDs may have a port that identifies the DDC 220. An implementation of a DDC 220 may control only the DD 216, and the path portion of the DUID may be the location of the DD. The path portion of the DUID may represent the location of the data unit within the DD (e.g., as a portion of a universal resource locator or other address). Another implementation of the DDC 220 may include DDs in addition to the DD 216 (not illustrated in FIG. 2), with part of the path portion selecting the DD 216 and another part of the path representing the location of the data unit in the DD 216. In an implementation, the portion of the path can include a portion representing a location or address of a particular DDSD, and another portion of the path represents a location within the DDSD.

The distributed datastore system 200 may be an implementation of distributed datastore system 100; may be an implementation of the computing device 900; may be a distributed datastore system 200 for executing the data flow 400 or the data flow 500; and/or may be a distributed datastore system 200 for executing the operations 600, 700, or 800.

Figure 3:
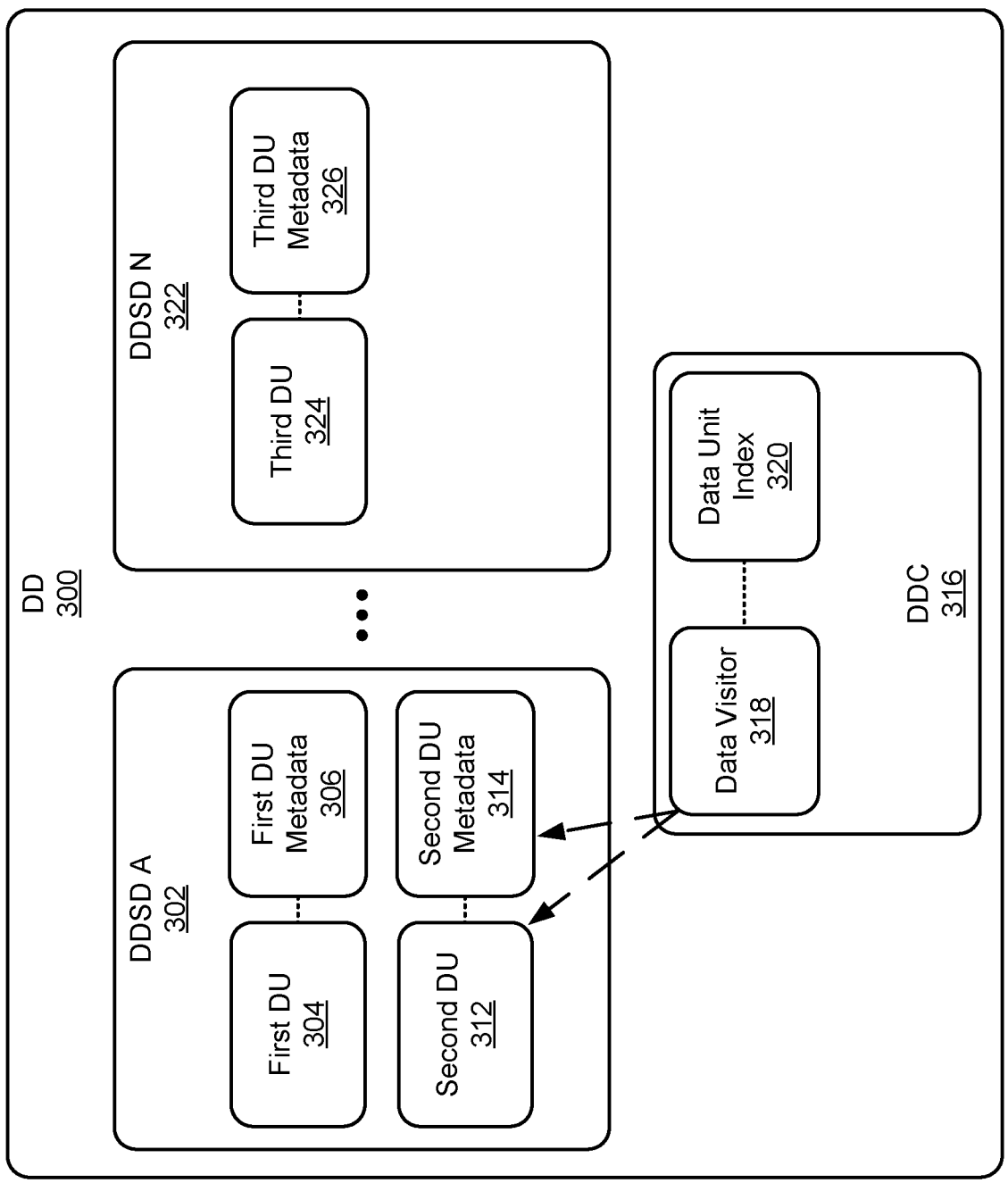
FIG. 3 illustrates an example of a DD.

FIG. 3 illustrates an example of a DD 300. The DD 300 includes a plurality of DDSDs illustrated as DDSD A 302 through DDSD N 322 and includes a DDC 316. The DDSD A 302 and DDSD N 322 include data units (DUs) and associated DU metadata. The Dus and associated metadata include a first DU 304 associated (e.g., associated in memory with) with first DU metadata 306 in the DDSD A 302, a second DU 312 associated with second DU metadata 314 in the DDSD A 302, and a third DU 324 associated with third DU metadata 326. As illustrated, the DDC 316 includes a data visitor 318 and a data unit index 320.

For purposes of illustration, the description of the DD 300 will focus on operations conducted by the data visitor 318 on or on behalf of the second DU 312 and the second DU metadata 314. In implementations, reliability logic (e.g., the reliability logic 110 described with respect to FIG. 1 or the reliability logic 210 described with respect to FIG. 2) generates the second DU metadata 314 to associate with the second DU 312 in response to a storage request to store the second DU 312. Examples of elements stored in the second DU metadata 314 include state data, an operating policy based on the data policy used to generate the data units and the metadata, and/or identifying data. State data describes the state of the associated data unit. Each data unit in the DD 300 can operate as a state machine using the data visitor 318. The data visitor 318 may retrieve the second DU 312 and the second DU metadata 314. The data visitor 318 can read the second DU metadata 314 and determine the state of the second DU 312. For example, the state data may include data about the interaction between the second DU 312 and a requesting application (e.g., a value of an ordering metric (s) representing a time or the last time associated with a request from the application to operate on the second DU 312), data regarding a position in a sequence of preconfigured operations (e.g., in a multi-preconfigured operation process), or data representing a value of an ordering metric associated with the storage of the second DU 312 and/or other associated data units (e.g., data units with the same ASID).

The data representing a value of an ordering metric associated with the other data units generated from the data to be stored can be used to determine when the data units sharing an ASID were last checked to see if the data units with the same ASID are retrievable within the distributed datastore network of which the DD 300 is an element. If the data units are not all accounted for in the distributed datastore system, the reliability logic may determine which data unit is missing and regenerate or reconstruct the data unit (e.g., from an error correction code scheme using the remaining retrievable data units).

The operating policy includes preconfigured operations that can be conducted on or on behalf of the second DU 312. Examples of preconfigured operations include migration of, replication of, error checking of, deduplication of, compression of, deletion of, modification of, or contacting an application on behalf of the data unit associated with the metadata. The operating policy and its preconfigured operations may be stored locally in the second DU metadata 314. The preconfigured operations may be or include references (e.g., pointers) to preconfigured operations stored in the DDs, the DDSDs, in the reliability logic (e.g., as data elements of the data policy used to generate the metadata), or a combination thereof. The operating policy may be based on a subscription of a user (e.g., a business organization or individual) of a user system or one or more preconfigured settings provided by the user.

The identifying data can include one or more of the ASID, a DUID, or a local reference to the second DU 312 within the DD 300. In an implementation, the ASID is or includes the path to the data stored within the application-side namespace. In an implementation, the DUID includes a path to the second DU 312 within the storage-side namespace. The ASID and DUID may be transmitted with appended prefixes or suffixes representing host names and domain names that can be interchanged, as is done in web servers.

As illustrated, the DDSD A 302 through the DDSD N 322 may be controlled by the DDC 316. In other implementations, each of the DDSD A 302 through the DDSD N 322 may, additionally or alternatively, include a local controller to control the operations of its respective DDSD. In any of these implementations of controllers, there may reside software or hardware elements executable by processors to operate as the data visitor 318 and/or the data unit index 320. The data visitor 318 operates on or on behalf of the second DU 312 stored in the DD 300 for which the DDC 316 operates. The data unit index 320 is an index (e.g., a sequential index) of paths to and/or of DUIDs of the data units.

In an implementation, the data visitor 318 operates on or on behalf of the data units in sequence, as presented in the index. For example, in the illustrated implementation, the data visitor 318 previously visited (e.g., operated on or on behalf of) the first DU 304, is currently visiting the second DU 312, and will, upon completion of preconfigured operations (if any) to be executed represented in the second DU metadata 314, visit the third DU 324. The data visitor 318 operates on the second DU 312 based on the second DU metadata 314. For example, the data visitor 318 interprets the state data, an operating policy based on the data policy used to generate the data units and the metadata, and/or identifying data of the second DU metadata 314 to determine how to operate on or on behalf of the second DU 312. In an implementation, if the second DU 312 satisfies an operation condition specified in the operating policy for executing a preconfigured operation, the data visitor executes the preconfigured operation responsive to the satisfaction of the operation condition.

In an implementation, the data visitor 318 migrates the second DU 312 from the DD 300 or the DDSD A 302 to another DD or DDSD. The conditions of the distributed datastore network may change. For example, the reliability logic and/or the data visitor 318 may determine that the availability of DDs or DDSDs has changed in satisfaction of an availability change condition. The availability change condition may include that a predefined number of DDs or DDSDs may be added, a predefined number of DDs or DDSDs may fail, a predefined number of DDs or DDSDs may be inaccessible (e.g., removed after a predefined time), a predefined number of DDs or DDSDs may store more data (proportionally or absolutely) than other DDSDs, or a DD or DDSD may store a predefined amount of data in excess of one or more other DDs or DDSDs. The data visitor 318 may determine that the satisfaction of the availability change condition further causes the second DU 312 to satisfy an operation condition for the migration. In order to migrate data to balance the data load or to protect the data in the DDSDs, the data visitor 318 may retrieve historical system state data based on the value of the ordering metric stored in the second DU metadata 314 that represents a time associated with the generation of the DUID (e.g., a time associated with a storage request to store the second DU 312 or a subsequent time at which the DUID for the second DU 312 is replaced with a new DUID). Also, the data policy may change (e.g., a user may change subscription terms or predefined settings for stored data units). The reliability logic and/or the data visitor 318 may determine that the change causes the second DU 312 to satisfy an operation condition for the migration and may respond to these changes by migrating the data unit (e.g., to a DDSD with different speed properties or at a different location to affect data latency based on the changed subscription).

In an implementation, the data visitor 318 may be configured in a datastore retrieval operation to use the value of the ordering metric stored in the second DU metadata 314 associated with a time at which the second DU 312 is generated or a time at which the DUID is modified in order to retrieve the list of the at least one datastore that satisfy the predefined datastore condition. The historical system state data may represent the state of the distributed datastore network at a time associated with the value of the ordering metric. Based on the historical system state data, the data visitor 318 and/or the reliability logic determine a different of the at least one DD or DDSD (different from the DD 300 or the DDSD A 302 on which the second DU 312 is currently stored) that satisfied the predefined datastore condition at the time of the last generation of the DUID represented by the value of the ordering metric. The data visitor 318 may then responsively migrate the second DU 312 to the different of the at least one DD or DDSD.

In an implementation, the data visitor 318 performs a replication of a data unit responsive to a change in data policy, a request for caching of a data unit, a request for buffering a data unit, or a loss of a data unit duplicate that causes the second DU 312 to satisfy an operation condition for the replication. For example, if the data policy changes, the data policy may call for duplication of the second DU 312. The data visitor 318 may conduct the datastore retrieval operation to determine the at least one datastore using the value of the ordering metric, as described, and may determine that the second DU 312 be replicated and the copy by stored to a DD or DDSD other than the DD 300 or the DDSD A 302 on which the original copy of the second DU 312 is stored.

In an implementation, the data visitor 318 may conduct or initiate a stored data check to determine data units other than the second DU 312 stored in the distributed datastore network that represent the data to be stored (e.g., when the data to be stored is stored as multiple data units with the same ASID). The data visitor 318 may determine that a predefined elapsed time or number of iterations since the last stored data check causes the second DU 312 to satisfy an operation condition for the stored data check. The stored data check may be used in deduplication efforts or to perform a self-healing operation. For example, the data visitor 318 may transmit a request to the reliability logic to conduct the stored data check. The reliability logic may determine, based on the DUID of the second DU 312, the ASID corresponding to the DUID. Using the ASID and the value of the ordering metric associated with the last DUID generated for the ASID, the reliability logic may regenerate all of the DUIDs of all data units generated to represent the stored data. The reliability logic 110 may attempt to retrieve all instances of the data units associated with the ASID by retrieving the at least one DD that satisfied the predefined datastore condition at the time represented by the value of the ordering metric. If any of the data units or duplicates (e.g., based on the data policy) associated with the second DU 312 are inaccessible, the reliability logic may regenerate or reconstruct and store the data unit or duplicate in accordance with the data policy in a self-healing operation. In an implementation in which the data units represent an error correction code scheme of the stored data, the missing data unit can be regenerated or reconstructed from one or more of the other data units associated with the stored data (e.g., data units having a common ASID). If the distributed datastore network stores more duplicates than is called for in the data policy, the reliability logic may remove a duplicate data unit in a deduplication operation. The deduplication and self-healing operations may be initiated by the data visitor 318 based on the second DU metadata 314.

In an implementation, the data visitor 318 is configured to run an error check on the second DU 312. The data visitor 318 may be configured to conduct the error check based on elapsed time or a request from the application or the reliability logic satisfying an operation condition for the error check. For example, the second DU 312 and/or the second DU metadata 314 may include a parity or other error-checking scheme internally to determine whether the second DU 312 contains an error. In an implementation, the DDC of a DD on which the second DU 312 is stored can receive a request to conduct an error check, write a flag or other indicator to the second DU metadata 314 to check the second DU 312 for a data error, and the data visitor 318 can perform the error correction the next time the data visitor 318 visits the second DU 312, based on the flag or other indicator.

In an implementation, the data visitor 318 determines, based on the operating policy of the second DU 312 stored in the second DU metadata 314, that the second DU 312 is to be compressed or decompressed. The data visitor 318 may be configured to conduct the compression or decompression based on the elapsed time since the last use of the second DU 312, the frequency of access of the second DU 312, a change in the data policy, or a request from the application or the reliability logic that satisfy an operation condition for the compression or decompression. This may be based on the data policy or a modification to the data policy. It can also be based on state data in the second DU metadata 314 representing that the second DU 312 has not been accessed for a predefined amount of time, is being accessed more frequently than before, or includes an element of a data policy that has changed (e.g., a user upgrades a data storage subscription to allow for faster access or downgrades the subscription for slower access after the time of the original storage or a time when the DUID is modified).

In an implementation, the data visitor 318 is configured to modify or delete the second DU 312. For example, the second DU metadata 314 may instruct the data visitor 318 to modify or delete the second DU 312 based on predefined conditions. The data visitor 318 may be configured to conduct the modification or deletion based on a request from the application or the reliability logic satisfying an operation condition for the deletion or modification. The data visitor 318 may delete or modify the second DU 312 based on instructions from the reliability logic or from the application via the reliability logic. Implementations are also contemplated in which DDC 316 and/or a controller of the DDSD A 302 controls deletion and/or modification operations on the second DU 312, separately from the data visitor 318. In an implementation, the data visitor 318 and/or the DDC 316 modifies the second DU 312 by formatting the second DU 312 into a different format. For example, the second DU 312 may be reformatted from a time-domain representation to a frequency-domain representation, from a bitmap format to a portable network graphics format, or from an image to a string or text representation. The reformatting instructions may be application-specific preconfigured operations stored in the second DU metadata 314 or stored as application-specific routines in the DDC 316. Also, in an implementation, if the second DU 312 is reformatted, the original copy of the second DU 312 may responsively be deleted.

In an implementation, the data visitor 318 is configured to contact the application and/or the reliability logic on behalf of the second DU 312 based on the second DU metadata 314. The data visitor 318 may be configured to conduct the contact application operation based on the elapsed time since the last time the application requested access to data from which the second DU 312 was generated or a request from the application or the reliability logic satisfying an operation condition for the contact application operation. For example, the second DU metadata 314 may contain state data (e.g., a value of an ordering metric) representing the last time the application and/or the reliability logic accessed the second DU 312. Based on the state data and/or the operating policy in the second DU metadata 314, the data visitor 318 may transmit a request to the reliability logic to (or consult the application to) determine whether the data represented by the ASID of the second DU 312 (e.g., stored in the second DU metadata 314) is still valid and/or still useful. In an implementation, the reliability logic and/or the application determines the validity or usefulness by confirming the data represented by the ASID is still represented in the application-side namespace. This can help prevent orphaned data units that no longer function and unnecessarily occupy space.

In implementations, the DDC 316 can perform some of the preconfigured operations instead of or in cooperation with the data visitor 318. In an implementation, a DDC 316 of the DD 300 on which the second DU 312 is stored can receive a request to conduct an operation, such as the preconfigured operations. The DDC 316 may write a flag or other indicator to the second DU metadata 314 to perform one of the preconfigured operations on the second DU 312, and the data visitor 318 can perform the preconfigured operations the next time the data visitor 318 visits the second DU 312, based on the flag or other indicator.

In an implementation, the data visitor 318 acts in a routine manner (e.g., without regard to triggering events or requests actively made but only responding to state data in the metadata) by iterating through data units, consulting the metadata associated with the data units to determine whether to perform a preconfigured operation on or on behalf of the data units, and then perform the preconfigured operations. In an implementation, the DDC 316 handles active operations to respond to requests or other triggering events (e.g., requests or other triggering events generated by the reliability logic or the application). In an implementation, the DDC 316 handles one or more of the active operations without the data visitor 318. In an implementation, the DDC 316 handles one or more of the active operations by modifying state data (e.g., by writing a flag or other indicator) of the second DU metadata 314, such that the routine operation of the data visitor 318 conducts preconfigured operations based on the modified state data.

In an implementation, after the data visitor 318 has executed the preconfigured operations on or on behalf of the second DU 312, the data visitor 318 may update the state data of the data unit in the second DU metadata 314 to reflect the completion of the preconfigured operation. For example, the data visitor 318 may reset a timer or counter (e.g., by providing a value of an ordering metric to the metadata at the time of the completion) for conducting one or more of the preconfigured operations. Using a data visitor 318 in conjunction with second DU metadata 314 specific to the second DU 312 can improve the scalability of the distributed datastore system and can make it less likely that a data unit will be orphaned.

In an implementation, if the data visitor 318 has performed a migration or deletion operation, the data visitor 318 and/or the DDC 316 may store data location metadata representing the second DU metadata 314, a portion of the second DU metadata 314, or other metadata about the migration or deletion operation to aid in a request for the second DU 312. For example, if the second DU 312 has been migrated, the data visitor and/or DDC 316 may store data location metadata representing a destination DD and/or DDSD to which the second DU was migrated. If the second DU 312 has been deleted, the data visitor 318 and/or the DDC 316 may maintain metadata representing the deletion. In an implementation, the data visitor 318 and/or the DDC 316 stores data representing the DD 300 as a source DD from which the second DU 312 was migrated in the second DU metadata 314 in the destination DD. Implementations are contemplated in which the second DU metadata 314 includes a record of all source and destination DDs from and to which the second DU 312 has been migrated.

In an implementation, the data visitor 318 is executable by one or more hardware processors. In this implementation, the data visitor 318 includes a metadata accessor executable by the one or more hardware processors and configured to access the second DU metadata 314 uniquely associated in memory with the second DU 312 stored in the distributed datastore network (e.g., in the DD 300). The second DU metadata 314 includes a state of the second DU 312 and an operating policy including a plurality of preconfigured operations. The operating policy was generated for the second DU 312 unit by reliability logic in association with the storage of the second DU 312. In this implementation, the data visitor 318 further includes an operation identifier executable by the one or more hardware processors and configured to identify at least one of the plurality of preconfigured operations to be executed in association with the second DU 312 based on a determination that the state of the second DU 312 satisfies an operation condition specified in the operating policy. In this implementation, the data visitor 318 further includes an operation executer executable by the one or more hardware processors and configured to execute the identified at least one of the plurality of preconfigured operations.

In an implementation, the second DU metadata 314 includes an ordering metric representing a time at which a storage request is made to store a data object from which the second DU 312 is generated or a time at which the reliability logic last modified a data unit identifier associated in memory with the second DU 312. In another implementation, the second DU metadata 314 further includes an application-side identifier. The application-side identifier is uniquely associated in memory with data to be stored by the reliability logic. The second DU 312 is generated by the reliability logic from the data to be stored. In an implementation, the reliability logic is configured to generate the second DU 312. The second DU 312 is operable to regenerate the data object using at least one other data unit associated in memory with the application-side identifier. In an implementation, the data unit identifier includes a path to the data unit interpretable within the distributed datastore network. In an implementation, the identified at least one of the plurality of preconfigured operations includes migration of, replication of, error checking of, deduplication of, compression of, deletion of, modification of, or transmitting instructions to the reliability logic on behalf of the data unit. In an implementation, the data visitor 318 further includes a next data unit accessor executable by the one or more hardware processors and configured to access, responsive to the execution, a next data unit based on a sequential index of data units, the next data unit referenced in the sequential index immediately after a reference to the second DU 312.

The DD 300 may be an implementation of the DD 216 described with respect to FIG. 2 or a DD of the distributed datastore network 112 described with respect to FIG. 1.

Figure 4:
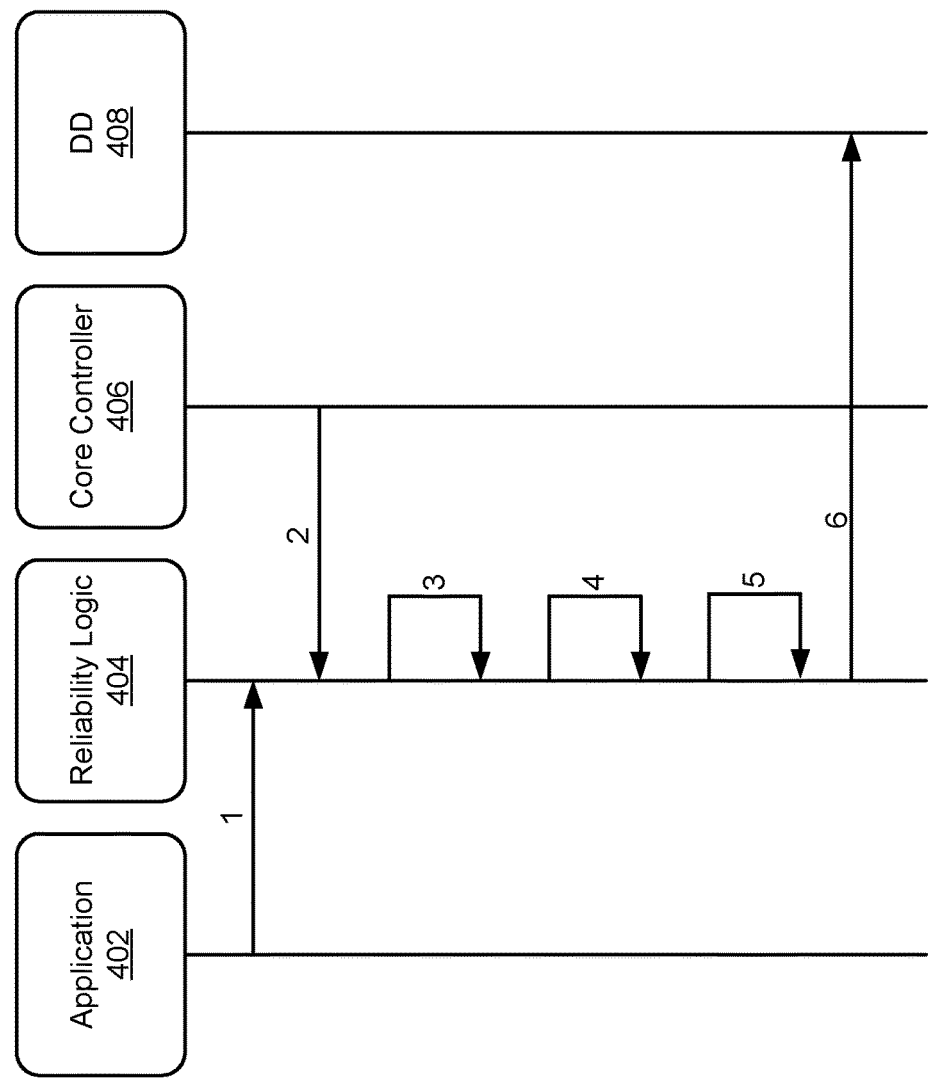
FIG. 4 illustrates an example data flow of example data storage operations.
Figure 5:
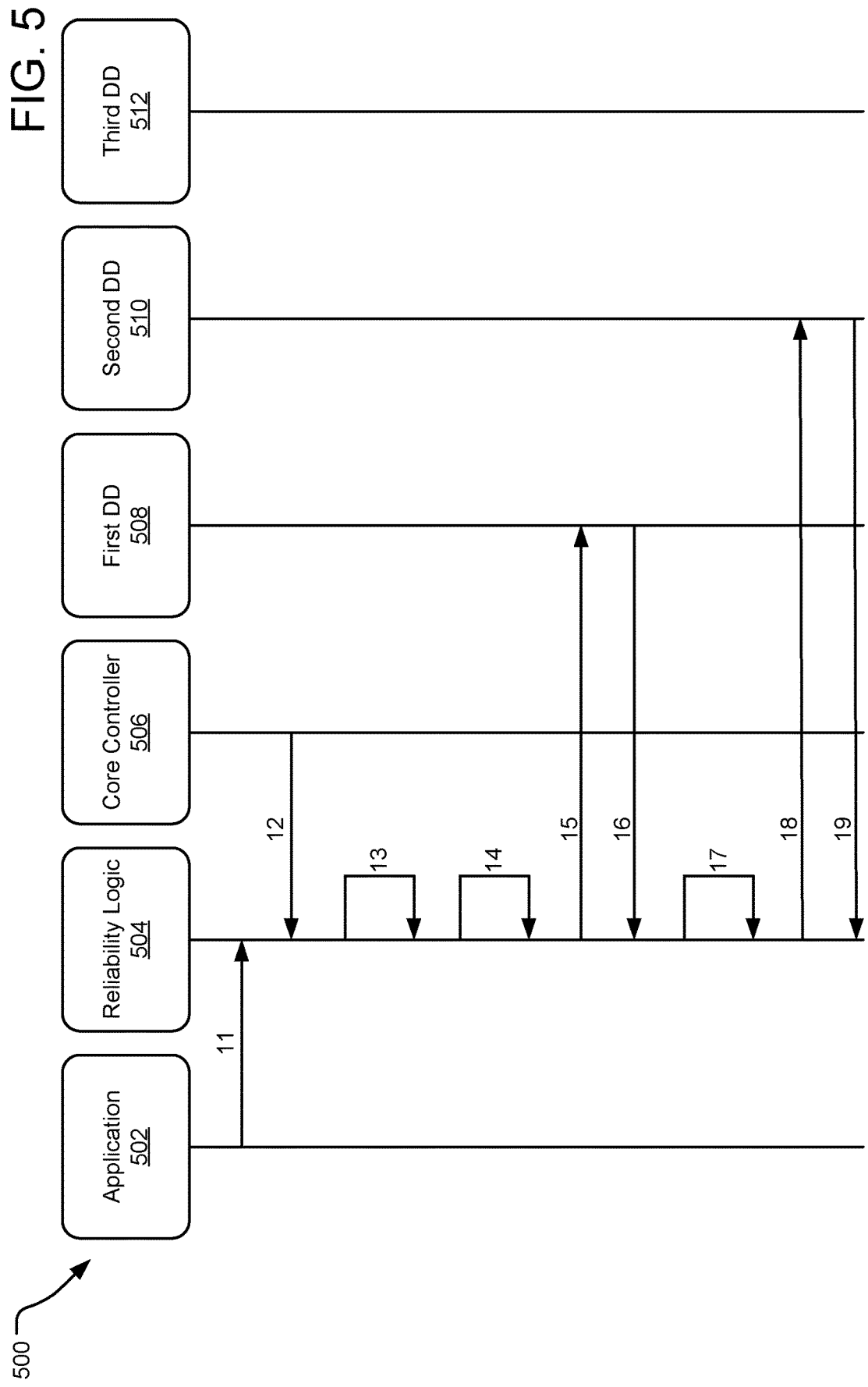
FIG. 5 illustrates an example data flow of example operations for operating on stored data.

FIGS. 4 and 5 illustrate example data flows, including a data flow 400 and a data flow 500, respectively, to be executed by implementations of any of the distributed datastore system 100 described with respect to FIG. 1, the distributed datastore system 200 described with respect to FIG. 2, or the DD 300 described with respect to FIG. 3.

FIG. 4 illustrates an example data flow 400 of example data storage operations. The data flow 400 begins with an application 402 transmitting a storage request to reliability logic 404 in communication 1. The data storage request may include and/or specify the data to be stored. The reliability logic 404 retrieves or receives current system state data provided by the core controller 406. The current system state data may represent a state of the distributed datastore system at a time associated with the storage request.

Based on the specified data, the reliability logic 404 initially generates a data unit identifier identifying a data unit to be stored in generation operation 3. The generation operation 3 may be based on an ordering metric representing a time associated with the storage request. The data unit may be a portion of or an element of an encoding of the specified data. The reliability logic determines at least one distributed datastore that satisfies a predefined datastore condition (e.g., based on a data policy) in operation 4. The reliability logic 404 generates metadata for each data unit based on a data policy in operation 5. The reliability logic 404 then transmits the data unit and/or data unit metadata to a DD 408 of the determined at least one DD in communication 6.

FIG. 5 illustrates an example data flow 500 of example operations for operating on stored data. The data flow 500 begins with an application 502 transmitting a data operation request specifying data stored in a distributed datastore network in communication 11. The data operation request may include an ASID representing the specified data in an application-side namespace. The reliability logic 504 retrieves or receives first system state data representing the state of the distributed datastore system at a first time associated with a past storage request to store the specified data in communication 12 from a (state monitor of a) core controller 506. In other implementations, the reliability logic 504 maintains the historical system state data locally such that the historical system state data can be retrieved locally. Based on the data operation request, the reliability logic 504 determines a DUID associated with the specified data in the distributed datastore system in a determining operation 13. In implementations in which the reliability logic 504 generates more than one data unit from the specified data (e.g., based on division, replication, or encoding of the specified data) and generates a (different or unique) DUID for each data unit.

The reliability logic 504 determines, based on the data operation request and the first system state data, at least one distributed datastore satisfying a predefined datastore condition in a determination operation 14. The predefined datastore condition is based on the availability of the at least one distributed datastore to store the specified data at the first time. The determined at least one distributed datastore includes a first DD 508 and a second DD 510. The data flow 500 further illustrates a third DD 512, which may or may not be included in the determined at least one distributed datastore.

The reliability logic 504 transmits a first query to the first DD 508 to determine whether a data unit representing the specified data is stored on the first DD 508, based on the satisfaction of the predefined datastore condition by the at least one distributed datastore in communication 15. The first DD 508 searches for a data unit with the determined DUID. The first DD 508 transmits a response that indicates the data unit with the DUID is not stored in the first DD 508. In determination 17, the reliability logic determines the second DD 510 is the next DD in the sequence of the determined at least one DD. The reliability logic 504 transmits a second query to determine whether the second DD 510 stores the data unit with the determined DUID in communication 18. The second DD 510 searches its DDSDs and finds the data unit with the DUID. The second DD 510 then transmits a response that the data unit is stored there and/or transmits the data unit to the reliability logic 504 in communication 19.

Notably, the third DD 512 is not queried in the data flow 500. One example reason for this could be that the third DD 512 is not included in the determined at least one distributed datastore. Examples of reasons for the exclusion include that the third DD 512 was not available within the distributed datastore system at the time of the request to store the specified data (e.g., was not connected to the distributed datastore system, was full, or had more data than other of the DDs in the distributed datastore system), the third DD 512 included storage incompatible with a data policy, the third DD 512 was a poor choice (e.g., based on the policy) that did not merit inclusion in the determined at least one data store list, or the third DD 512 otherwise failed to satisfy a predefined datastore condition.

Figure 6:
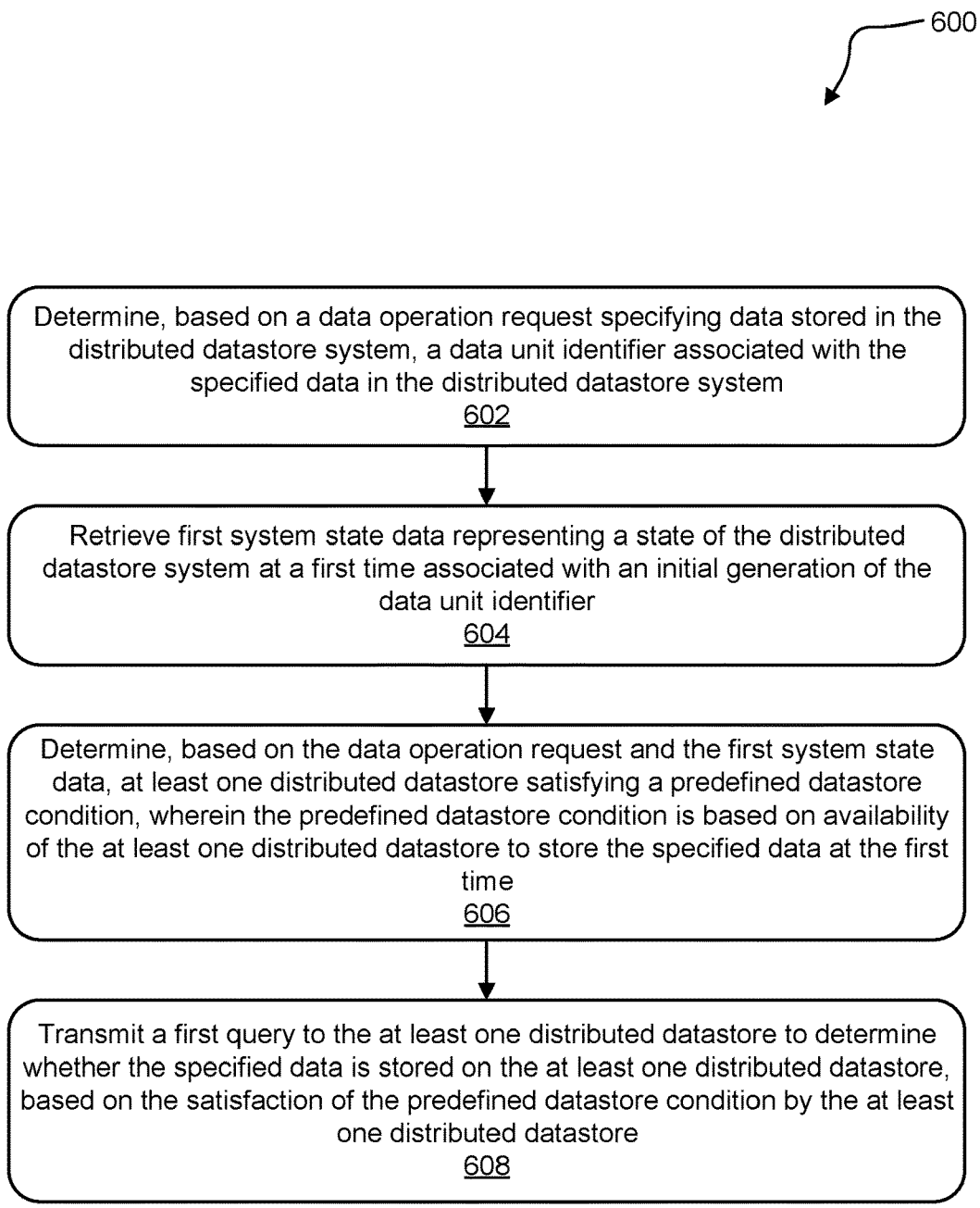
FIG. 6 illustrates example operations for operating on a stored data unit.
Figure 7:
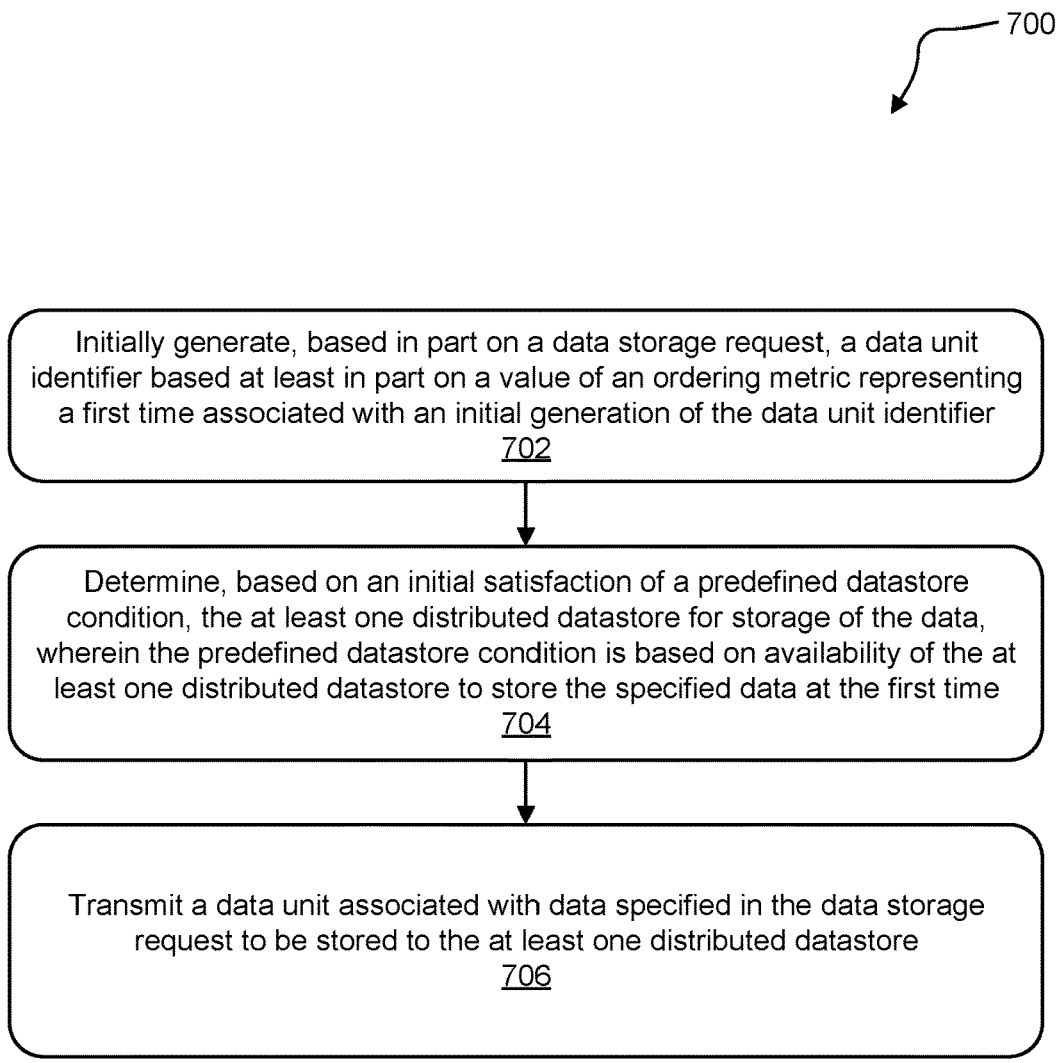
FIG. 7 illustrates example operations for storing a data unit.
Figure 8:
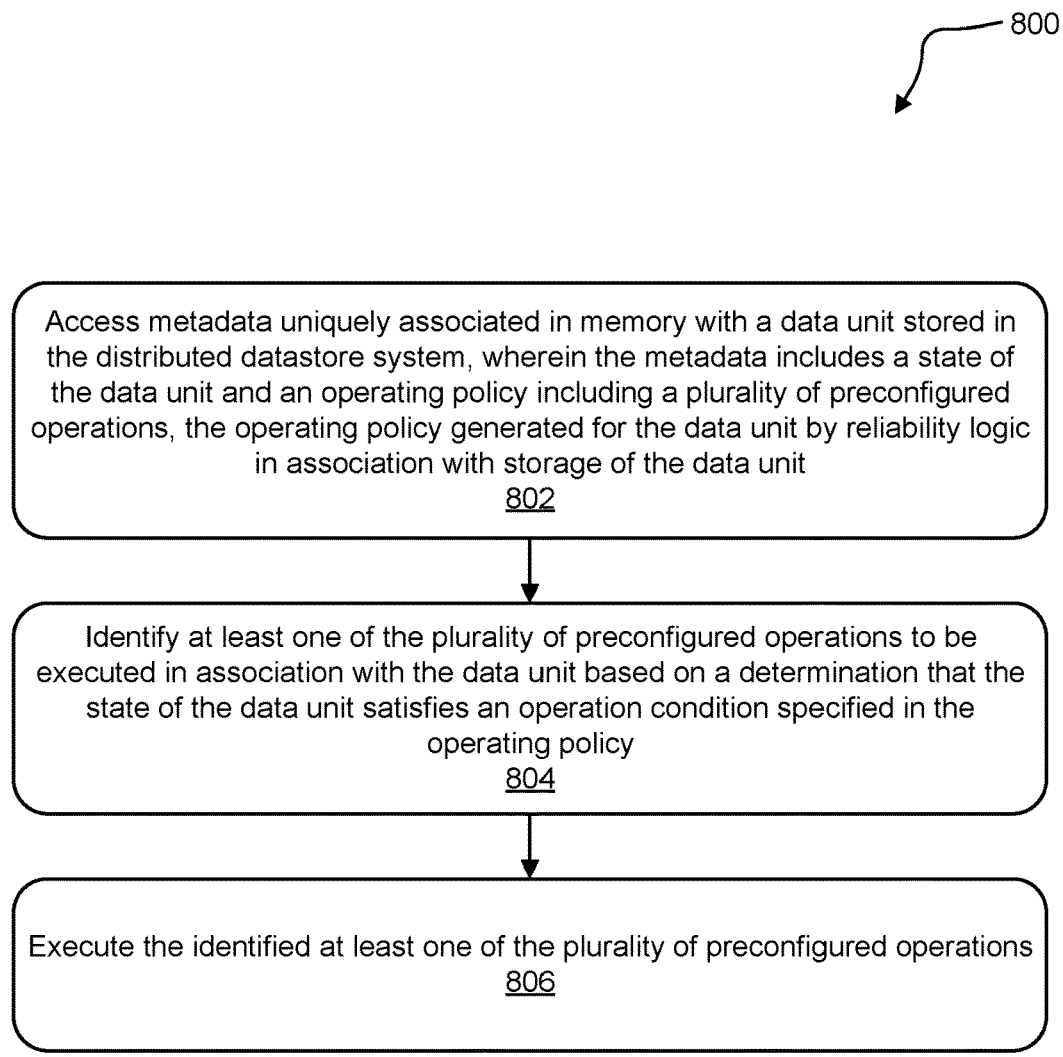
FIG. 8 illustrates example operations for a data visitor to operate on or on behalf of a data unit.

The example operations 600, 700, and 800 illustrated in and described with respect to FIGS. 6, 7, and 8, respectively, may be executable by implementations of any of the distributed datastore system 100 described with respect to FIG. 1, the distributed datastore system 200 described with respect to FIG. 2, or the DD 300 described with respect to FIG. 3.

FIG. 6 illustrates example operations 600 for operating on a stored data unit. A determining operation 602 determines, based on a data operation request specifying data stored in the distributed datastore system, a data unit identifier associated with the specified data in the distributed datastore system.

After one or more data units are stored representing the data to be stored (e.g., in association with a single ASID representing the data to be stored in the application-side namespace), the application may generate a data operation request to retrieve or operate on the stored data. In implementations, the application generates the data operation request specifying data to be operated on in the distributed datastore network.

The data operation request may include the ASID and/or the value of the ordering metric associated with a time at which the latest DUID for the data units was generated (e.g., at a time the data was stored or at a subsequent time at which the DUIDs for the ASID were updated). The application may include the ASID in a data operation request. In an implementation, the ASID is or includes a path to the data stored or to be stored within the application-side namespace. In implementations, the ASID and/or a value of an ordering metric associated with a time of a storage request or a time of regeneration of a data unit identifier are stored locally on the user system. The ASID and/or the value of the ordering metric may be stored in the application or in a database on the user system generated based on instructions from the reliability logic. Implementations are contemplated in which the ASID and/or the value of the ordering metric are stored additionally or alternatively in the reliability logic. In implementations, the reliability logic is stored in the user system. Implementations are contemplated where the reliability logic is an element of a third-party storage service (e.g., as illustrated in FIG. 2).

The determining operation 602 may regenerate the DUID by accessing the value of an ordering metric representing a first time associated with the storage of the specified data and regenerating the data unit identifier based on the accessed value of the ordering metric. The value of the ordering metric may alternatively represent a time associated with an updating or issuing of a new DUD associated with a data unit generated from the specified data.

A retrieving operation 604 retrieves first system state data representing a state of the distributed datastore system at a first time associated with an initial generation of the data unit identifier. The first time may be represented by the value of the ordering metric, and the first system state data may be retrievable in the retrieving operation 604 based on the value of the ordering metric.

A determining operation 606 determines, based on the data operation request and the first system state data, at least one distributed datastore satisfying a predefined datastore condition, wherein the predefined datastore condition is based on the availability of the at least one distributed datastore to store the specified data at the first time.

The predefined datastore condition is based on the system state data representing the state of the distributed datastore network at the time associated with the storage request and/or at a time the DUIDs of the data units generated from the specified data were last generated.

The reliability logic may take data from the data operation request and redetermine the at least one DD in the roster based on the system state data at the first time to "guess" on which DD the at least one data unit representing the specified is stored. The reliability logic issues the guess requests to determine the presence of the data units in the at least one DD until the at least one DD are exhausted. While the system guesses in which DDs the data is located, rather than direct addressing, the guessing allows for better scalability of and better security of the data units stored in the distributed datastore network.

A transmitting operation 608 transmits a first query to the determined at least one DD to determine whether the specified data is stored on the determined at least one DD, based on the satisfaction of the predefined datastore condition by the at least one DD. If a data unit is found in the at least one DD, the reliability logic and/or a data visitor can perform data operations in the data operation request on the data unit.

FIG. 7 illustrates example operations 700 for storing a data unit. An initially generating operation 702 initially generates, based in part on a data storage request, a data unit identifier based at least in part on a value of an ordering metric representing a first time associated with an initial generation of the data unit identifier. The reliability logic may generate an ASID representing the data specified in the data storage request and may access a value of an ordering metric representing a first time associated with the storage request. One or more of the ASID and the ordering metric may be transmitted back to the user system executing the application that made the data storage request for local storage within the user system of the transmitted ASID and/or ordering metric. The generated ASID and accessed value of the ordering metric may be used in future requests to access the data to be stored specified in the data storage request. The ASID may uniquely identify the data to be stored in the application-side namespace.

The distributed datastore system may operate to store specified data as one or more data units to DDs based on system state data representing the state of the distributed datastore system at a first time associated with the storage request.

A determining operation 704 determines, based on an initial satisfaction of a predefined datastore condition, the at least one distributed datastore for storage of the data, wherein the predefined datastore condition is based on the availability of the at least one distributed datastore to store the specified data at the first time.

The reliability logic determines, based on the system state data, at least one DD in the distributed datastore network and/or based on a data policy, where to store at least one data unit representing the data in the at least one DD. The at least one DD may be listed in a roster or index. If the storage operation for a data unit fails in one of the at least one DD in the roster, the reliability logic may store the data unit in another of the at least one DD. The application may generate a data operation request to retrieve or otherwise operate on the specified data.

In an implementation, the application transmits a storage request to the reliability logic to store data specified in the request to the distributed datastore network. In response to the storage request, the reliability logic generates a data unit identifier (DUID) as described herein, based on one or more of a data policy, the ASID, the system state data representing the state of the distributed datastore system at a time associated with the data storage request, or the time associated with the data storage request.

A transmitting operation 706 transmits a data unit associated with data specified in the data storage request to be stored to the at least one distributed datastore. The data unit may be transmitted with an associated DUID generated for and uniquely identifying the data unit in the distributed datastore system.

FIG. 8 illustrates example operations 800 for a data visitor to operate on or on behalf of a data unit. An accessing operation 802 accesses metadata uniquely associated in memory with a data unit stored in the distributed datastore system. The metadata includes a state of the data unit and an operating policy, including a plurality of preconfigured operations. The operating policy is generated for the data unit by reliability logic in association with the storage of the data unit.

In an implementation, the data visitor manages the data in the distributed datastore system by first accessing metadata uniquely associated in memory with a data unit stored in the distributed datastore system. The metadata may include a state of the data unit and an operating policy. The operating policy includes a plurality of preconfigured operations and is generated for the unit by the reliability logic in association with the storage of the data unit. In this implementation, the reliability logic identifies at least one of the plurality of preconfigured operations to be executed in association with the data unit based on a determination that the state of the data unit satisfies an operation condition specified in the operating policy. In this implementation, the reliability logic executes the identified at least one of the plurality of preconfigured operations.

The data visitor may retrieve the data unit and its associated metadata. The data visitor can read the metadata and determine a state of the data unit. For example, the state data may include data about the interaction between the data unit and the application (e.g., a value of an ordering metric(s) representing a time at which a storage request is made to store a data object from which the data unit is generated or a time at which the reliability logic last modified the DUID), data regarding a position in a sequence of preconfigured operations (e.g., in a multi-preconfigured operation process), or data representing a value of an ordering metric associated with the other data units generated from the data to be stored (e.g., data units with the same ASID). The data representing a value of an ordering metric associated with the other data units generated from the data to be stored can be used to determine when the data units sharing an ASID were last checked to see if they were all there. If the data units are not all accounted for in the distributed datastore system, the reliability logic may determine which data unit is missing and regenerate or reconstruct the data unit (e.g., from an error correction code scheme using the remaining retrievable data units).

An identifying operation 804 identifies at least one of the plurality of preconfigured operations to be executed in association with the data unit based on a determination that the state of the data unit satisfies an operation condition specified in the operating policy. The identifying operation 804 can be conducted by the data visitor. In an implementation, the operating policy includes preconfigured operations that can be conducted on or on behalf of the stored data unit. Examples of preconfigured operations include migration of, replication of, error checking of, deduplication of, compression of, deletion of, modification of, or contacting an application on behalf of the data unit associated with the metadata. The operating policy and its preconfigured operations may be stored locally in the metadata. The preconfigured operations may be or include references (e.g., pointers) to preconfigured operations stored in the DDs, the DDSDs, in the reliability logic (e.g., as data elements of the data policy used to generate the metadata), or a combination thereof. The operating policy may be based on a subscription of a user (e.g., a business organization or individual) of the user system or one or more preconfigured settings provided by the user.

The identifying data can include one or more of the ASID, a DUID, or a local reference to the data unit within the DD storing the data unit. In an implementation, the ASID is or includes the path to the data stored within the application-side namespace. In an implementation, the DUID includes a path to the data unit within the storage-side namespace. The ASID and DUID may be transmitted with appended prefixes or suffixes representing host names and domain names that can be interchanged, as is done in web servers.

In an implementation, each DD includes one or more DDSDs. The DDSDs may be controlled by a distributed data store controller (DDC), or each of the DDSDs may include a local controller to control the operations of its respective DDSD. In any of these controllers, there may reside software or hardware elements executable by processors to operate as a data visitor and/or a data unit index. The data visitor operates on or on behalf of the data units stored in the DD and/or DDSD for which the controller operates. The data unit index is a sequential index of paths to the data units and/or of DUIDs of the data units. In an implementation, the data visitor operates on or on behalf of the data units in sequence, as presented in the index. The data visitor operates on a data unit based on the metadata stored in association with the data unit. For example, the data visitor interprets one of the state data, an operating policy based on the data policy used to generate the data units and the metadata, and/or identifying data to determine how to operate on or on behalf of the data unit.

An executing operation 806 executes the identified at least one of the plurality of preconfigured operations. The executing operation 806 executes using the data visitor.

In an implementation, the data visitor is configured to migrate the data unit from one DD or DDSD to another DD or DDSD, perform a replication of a data unit, conduct or initiate a stored data check, run an error check on the data unit, compresses or decompresses the data unit, modifies or deletes the data unit, or contacts the application and/or the reliability logic on behalf of the data unit, as described herein with respect to FIG. 3.

In an implementation, after the data visitor has executed the preconfigured operations on or on behalf of the data unit, the data visitor may update the state data of the data unit in the metadata associated with the data unit to reflect the completion of the preconfigured operation. For example, the data visitor may reset a timer (e.g., by providing a value of an ordering metric to the metadata at the time of the completion) for conducting one or more of the preconfigured operations. Using a data visitor in conjunction with metadata specific to a data unit can improve the scalability of the distributed datastore system and can make it less likely that a data unit will be orphaned (e.g., reside within the distributed datastore network without an associated data object having the same ASID in the application-side namespace).

Figure 9:
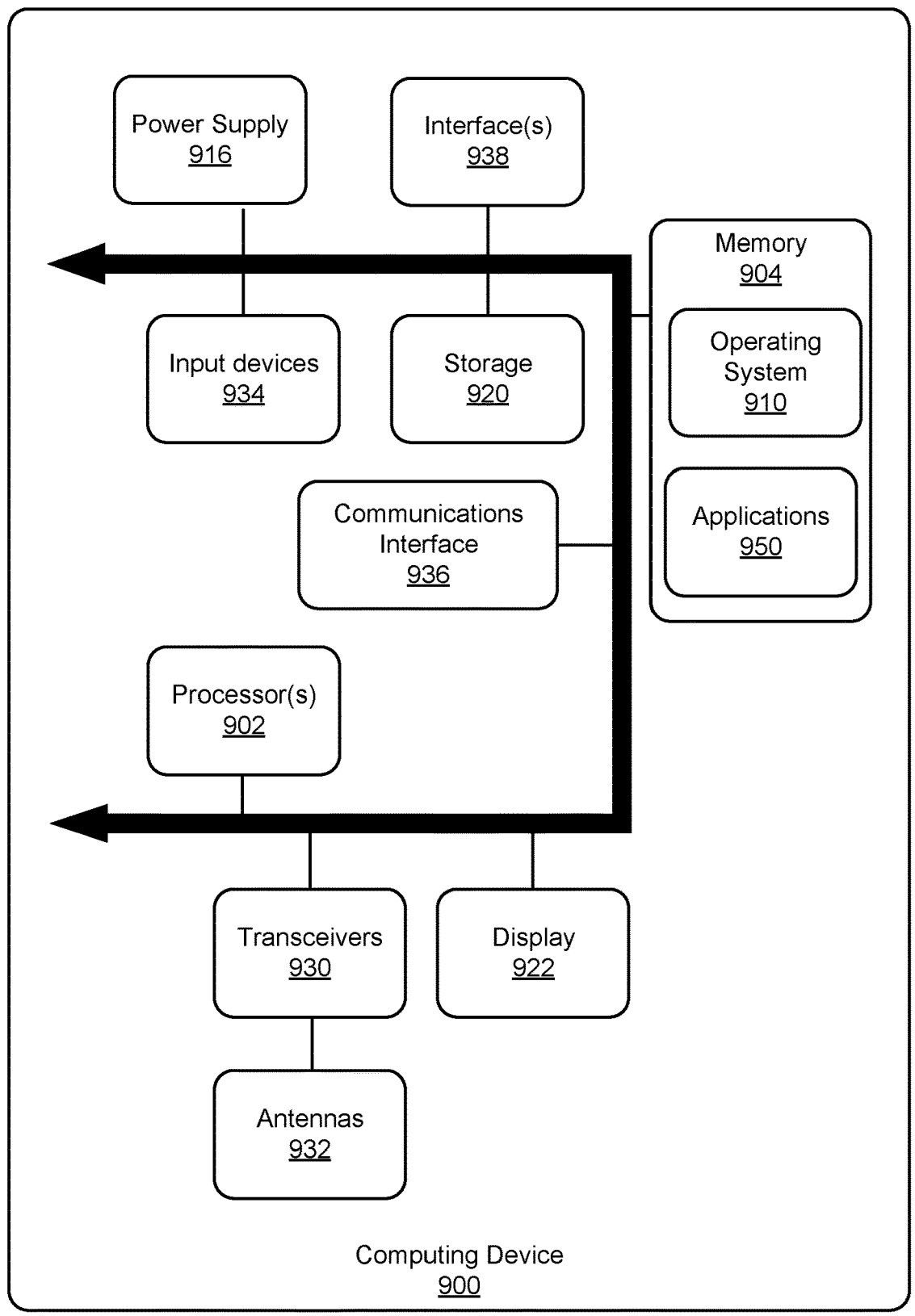
FIG. 9 illustrates an example computing system.

FIG. 9 illustrates an example computing device 900 for implementing the features and operations of the described technology. The computing device 900 may embody a remote-control device or a physically controlled device and is an example network-connected and/or network-capable device and may be a client device, such as a laptop, mobile device, desktop, tablet; a server/cloud device; an internet-of-things device; an electronic accessory; or another electronic device. The computing device 900 includes one or more processor(s) 902 and a memory 904. The memory 904 generally includes both volatile memory (e.g., RAM) and nonvolatile memory (e.g., flash memory). An operating system 910 resides in the memory 904 and is executed by the processor(s) 902. Any of the user system 102, the distributed datastore network 112, the cloud network 106, the user system 202, the cloud network 106, the service entity system 206, the services 208, the distributed datastore network 222, the core controller 212, the DDC 220, the DDSDs 218, the DD 300, the DDSD A 302, the DDSD N 322, the DDC 316, and/or adapters with reliability logic may be or may include implementations of the computing device 900.

In an example computing device 900, as shown in FIG. 9, one or more modules or segments, such as applications 950, reliability logic instances, state monitors, data visitors, and/or applications of end-user systems are loaded into the operating system 910 on the memory 904 and/or storage 920 and executed by processor(s) 902. The storage 920 may include one or more tangible storage media devices and may store data, DUIDs, ASIDs, predefined datastore conditions, migration conditions, data policies, storage tiers, data latency, data access, system state data, ordering metrics, timestamps, locally and globally unique identifiers, data reads, data modifications, instructions, requests, responses, and/or other data and be local to the computing device 900 or may be remote and communicatively connected to the computing device 900. The tangible storage media devices may include one or more tangible processor-readable storage media embodied with instructions for executing on one or more processors and circuits of a computing device a process. Examples of the storage 920 may include the DDSDs 218.

The computing device 900 includes a power supply 916, which is powered by one or more batteries or other power sources and which provides power to other components of the computing device 900. The power supply 916 may also be connected to an external power source that overrides or recharges the built-in batteries or other power sources.

The computing device 900 may include one or more communication transceivers 930, which may be connected to one or more antenna(s) 932 to provide network connectivity (e.g., mobile phone network, Wi-Fi®, Bluetooth®) to one or more other servers and/or client devices (e.g., mobile devices, desktop computers, or laptop computers). The computing device 900 may further include a communications interface 936 (e.g., a network adapter), which is a type of computing device. The computing device 900 may use the communications interface 936 and any other types of computing devices for establishing connections over a wide-area network (WAN) or local-area network (LAN). It should be appreciated that the network connections shown are examples and that other computing devices and means for establishing a communications link between the computing device 900 and other devices may be used.

The computing device 900 may include one or more input devices 934 such that a user may enter commands and information (e.g., a keyboard or mouse). An example input device may include an adapter that stores and or executes reliability logic (e.g., the reliability logic 210). In implementations that include the adapter with reliability logic, the adapter may be an element of or adapted to interface with any of the implementations of the computing device 900. These and other input devices may be coupled to the server by one or more interfaces 938, such as a serial port interface, parallel port, or universal serial bus (USB). The computing device 900 may further include a display 922, such as a touchscreen display.

The computing device 900 may include a variety of tangible processor-readable storage media and intangible processor-readable communication signals. Tangible processor-readable storage can be embodied by any available media that can be accessed by the computing device 900 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 900. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

The logical operations making up implementations of the technology described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

Clause 1. A method of operating on a data unit stored in a distributed datastore system, comprising: determining, based on a data operation request specifying data stored in the distributed datastore system, a data unit identifier associated with the specified data in the distributed datastore system; retrieving first system state data representing a state of the distributed datastore system at a first time associated with an initial generation of the data unit identifier; determining, based on the data operation request and the first system state data, at least one distributed datastore satisfying a predefined datastore condition, wherein the predefined datastore condition is based on availability of the at least one distributed datastore to store the specified data at the first time; and transmitting a query to the at least one distributed datastore to determine whether a data unit generated from the specified data is stored on the at least one distributed datastore, based on satisfaction of the predefined datastore condition by the at least one distributed datastore.

Clause 2. The method of clause 1, further comprising: initially generating, based in part on a data storage request, the data unit identifier based at least in part on a value of an ordering metric representing the first time; determining, based on an initial satisfaction of the predefined datastore condition, the at least one distributed datastore for storage of the data; and transmitting the data unit to be stored to the at least one distributed datastore, the operation of determining the data unit identifier being responsive to the operation of transmitting the data unit.

Clause 3. The method of clause 2, wherein the operation of initially generating the data unit identifier further comprises: combining input to generate the data unit identifier, wherein the input includes the value of the ordering metric or an application-side identifier an application that generated the data operation request uses to identify the specified data.

Clause 4. The method of one of clauses 1-3, wherein the predefined datastore condition further includes whether the at least one distributed datastore complies with a data policy, the data policy including whether the at least one distributed datastore satisfies a data operation performance requirement.

Clause 5. The method of one of clauses 1-4, wherein the specified data is stored in the at least one distributed datastore as more than one data unit including the data unit, the data unit identifier is one of a plurality of data unit identifiers, and each of the more than one data unit is uniquely associated in memory with a different one of the plurality of data unit identifiers, the data unit identifier identifying the data unit uniquely among data unit identifiers in the distributed datastore system.

Clause 6. The method of clause 5, wherein the more than one data unit provide for reconstruction of a first of the more than one data unit based at least on a second of the more than one data unit different from the first of the more than one data unit.

Clause 7. The method of one of clauses 1-6, wherein the operation of determining the data unit identifier further comprises: accessing an ordering metric representing the first time based on the data operation request; and regenerating the data unit identifier based on the accessed ordering metric.

Clause 8. The method of one of clauses 1-7, further comprising: determining, based on system state data associated with an ordering metric, that availability of datastores in the distributed datastore system satisfies an availability change condition, the ordering metric representing a second time later than the first time; generating, based on the ordering metric, a second data unit identifier, responsive to the satisfaction of the availability change condition; and transmitting an instruction to associate in memory the data unit with the second data unit identifier.

Clause 9. The method of one of clauses 1-8, wherein the operation of determining the data unit identifier further comprises: determining that the at least one distributed datastore does not store a data unit associated with the data unit identifier; and transmitting a query, based on the data unit identifier, to an active distributed datastore other than the at least one distributed datastore in the distributed datastore system to determine whether the data unit is stored on the active distributed datastore.

Clause 10. The method of one of clauses 1-9, further including receiving the first system state data associated with the value of the ordering metric from a core controller of the distributed datastore system, wherein the core controller is operable to receive and collect system state data from each distributed datastore in the distributed datastore system.

Clause 11. The method of one of clauses 1-10, further including transmitting the data unit identifier to be stored in association with the data unit.

Clause 12. A system for operating on a data unit stored in a distributed datastore network, the system comprising: one or more hardware processors; and reliability logic, including: a data unit identifier determiner executable by the one or more hardware processors and configured to determine, based on a data operation request specifying data stored in the distributed datastore network, a data unit identifier associated with the specified data in the distributed datastore network; a system state data retriever executable by the one or more hardware processors and configured to retrieve first system state data representing a state of the distributed datastore network at a first time associated with an initial generation of the data unit identifier; a distributed datastore determiner executable by the one or more hardware processors and configured to determine, based on the data operation request and the first system state data, at least one distributed datastore satisfying a predefined datastore condition, wherein the predefined datastore condition is based on availability of the at least one distributed datastore to store the specified data at the first time; and a query transmitter executable by the one or more hardware processors and configured to transmit a query to the at least one distributed datastore to determine whether a data unit generated from the specified data is stored on the at least one distributed datastore, based on satisfaction of the predefined datastore condition by the at least one distributed datastore.

Clause 13. The system of clause 12, wherein the data unit identifier determiner is further configured to initially generate, based in part on a data storage request, the data unit identifier based at least in part on a value of an ordering metric representing the first time and wherein the distributed datastore determiner is further configured to determine, based on an initial satisfaction of the predefined datastore condition, the at least one distributed datastore for storage of the data, the system further comprising: a data transmitter executable by the one or more hardware processors and configured to transmit the data unit to be stored to the at least one distributed datastore, the data unit identifier determiner configured to determiner the data unit identifier responsive to the data transmitter transmitting the data unit to be stored.

Clause 14. The system of clause 13, wherein the data unit identifier determiner includes: a data combiner executable by the one or more processors and configured to combine input to generate the data unit identifier, wherein the input includes the value of the ordering metric or an application-side identifier an application that generated the data operation request uses to identify the specified data.

Clause 15. The system of one of clauses 12-14, wherein the predefined datastore condition further includes whether the at least one distributed datastore complies with a data policy, the data policy including whether the at least one distributed datastore satisfies a data operation performance requirement.

Clause 17. The system of one of clauses 12-15, wherein the specified data is stored in the at least one distributed datastore as more than one data unit including the data unit, the data unit identifier is one of a plurality of data unit identifiers, and each of the more than one data unit is uniquely associated in memory with a different one of the plurality of data unit identifiers, the data unit identifier identifying the data unit uniquely among data unit identifiers in the distributed datastore network.

Clause 18. The system of one of clauses 12-16, wherein the more than one data unit provide for reconstruction of a first of the more than one data unit based at least on a second of the more than one data unit different from the first of the more than one data unit.

Clause 19. One or more tangible processor-readable storage media embodied with instructions for executing on one or more processors and circuits of a computing device a process of operating on a data unit stored in a distributed datastore system, the process comprising: determining, based on a data operation request specifying data stored in the distributed datastore system, a data unit identifier associated with the specified data in the distributed datastore system; retrieving first system state data representing a state of the distributed datastore system at a first time associated with an initial generation of the data unit identifier; determining, based on the data operation request and the first system state data, at least one distributed datastore satisfying a predefined datastore condition, wherein the predefined datastore condition is based on availability of the at least one distributed datastore to store the specified data at the first time; and transmitting a query to the at least one distributed datastore to determine whether a data unit generated from the specified data is stored on the at least one distributed datastore, based on satisfaction of the predefined datastore condition by the at least one distributed datastore.

Clause 19. The one or more tangible processor-readable storage media of clause 18, the process further comprising: initially generating, based in part on a data storage request, the data unit identifier based at least in part on a value of an ordering metric representing the first time; determining, based on an initial satisfaction of the predefined datastore condition, the at least one distributed datastore for storage of the data; and transmitting the data unit to be stored to the at least one distributed datastore, the operation of determining the data unit identifier being responsive to the operation of transmitting the data unit.

Clause 20. The one or more tangible processor-readable storage media of clause 19, wherein the operation of initially generating the data unit identifier further comprises: combining input to generate the data unit identifier, wherein the input includes the value of the ordering metric or an application-side identifier an application that generated the data operation request uses to identify the specified data.

Clause 21. The one or more tangible processor-readable storage media of one of clauses 18-20, wherein the predefined datastore condition further includes whether the at least one distributed datastore complies with a data policy, the data policy including whether the at least one distributed datastore satisfies a data operation performance requirement.

Clause 22. The one or more tangible processor-readable storage media of one of clauses 18-21, wherein the operation of determining the data unit identifier further comprises: accessing an ordering metric representing the first time based on the data operation request; and regenerating the data unit identifier based on the accessed ordering metric.

Clause 23. A system for operating on a data unit stored in a distributed datastore system, comprising: means for determining, based on a data operation request specifying data stored in the distributed datastore system, a data unit identifier associated with the specified data in the distributed datastore system; means for retrieving first system state data representing a state of the distributed datastore system at a first time associated with an initial generation of the data unit identifier; means for determining, based on the data operation request and the first system state data, at least one distributed datastore satisfying a predefined datastore condition, wherein the predefined datastore condition is based on availability of the at least one distributed datastore to store the specified data at the first time; and means for transmitting a query to the at least one distributed datastore to determine whether a data unit generated from the specified data is stored on the at least one distributed datastore, based on satisfaction of the predefined datastore condition by the at least one distributed datastore.

Clause 24. The system of clause 23, further comprising: means for initially generating, based in part on a data storage request, the data unit identifier based at least in part on a value of an ordering metric representing the first time; means for determining, based on an initial satisfaction of the predefined datastore condition, the at least one distributed datastore for storage of the data; and means for transmitting the data unit to be stored to the at least one distributed datastore, the determination of the data unit identifier being responsive to the transmission of the data unit.

Clause 25. The system of clause 24, wherein the means for initially generating the data unit identifier further comprises: means for combining input to generate the data unit identifier, wherein the input includes the value of the ordering metric or an application-side identifier an application that generated the data operation request uses to identify the specified data.

Clause 26. The system of one of clauses 23-25, wherein the predefined datastore condition further includes whether the at least one distributed datastore complies with a data policy, the data policy including whether the at least one distributed datastore satisfies a data operation performance requirement.

Clause 27. The system of one of clauses 23-26, wherein the specified data is stored in the at least one distributed datastore as more than one data unit including the data unit, the data unit identifier is one of a plurality of data unit identifiers, and each of the more than one data unit is uniquely associated in memory with a different one of the plurality of data unit identifiers, the data unit identifier identifying the data unit uniquely among data unit identifiers in the distributed datastore system.

Clause 28. The system of clause 27, wherein the more than one data unit provide for reconstruction of a first of the more than one data unit based at least on a second of the more than one data unit different from the first of the more than one data unit.

Clause 29. The system of one of clauses 23-28, wherein means for determining the data unit identifier further comprises: means for accessing an ordering metric representing the first time based on the data operation request; and means for regenerating the data unit identifier based on the accessed ordering metric.

Clause 30. The system of one of clauses 23-29, further comprising: means for determining, based on system state data associated with an ordering metric, that availability of datastores in the distributed datastore system satisfies an availability change condition, the ordering metric representing a second time later than the first time; means for generating, based on the ordering metric, a second data unit identifier, responsive to the satisfaction of the availability change condition; and means for transmitting an instruction to associate in memory the data unit with the second data unit identifier.

Clause 31. The system of one of clauses 23-30, wherein means for determining the data unit identifier further comprises: means for determining that the at least one distributed datastore does not store a data unit associated with the data unit identifier; and means for transmitting a query, based on the data unit identifier, to an active distributed datastore other than the at least one distributed datastore in the distributed datastore system to determine whether the data unit is stored on the active distributed datastore.

Clause 32. The system of one of clauses 23-31, further including means for receiving the first system state data associated with the value of the ordering metric from a core controller of the distributed datastore system, wherein the core controller is operable to receive and collect system state data from each distributed datastore in the distributed datastore system.

Clause 33. The system of one of clauses 23-32, further including means for transmitting the data unit identifier to be stored in association with the data unit.

Clause 34. A method of managing data in a distributed datastore system, comprising: accessing metadata uniquely associated in memory with a data unit stored in the distributed datastore system, wherein the metadata includes a state of the data unit and an operating policy including a plurality of preconfigured operations, the operating policy generated for the data unit by reliability logic in association with storage of the data unit; identifying at least one of the plurality of preconfigured operations to be executed in association with the data unit based on a determination that the state of the data unit satisfies an operation condition specified in the operating policy; and executing the identified at least one of the plurality of preconfigured operations.

Clause 35. The method of managing data in a distributed datastore system of clause 34, wherein the metadata includes an ordering metric representing: a time at which a storage request is made to store a data object from which the data unit is generated; or a time at which the reliability logic last modified a data unit identifier associated in memory with the data unit.

Clause 36. The method of managing data in a distributed datastore system of clause 35, wherein the metadata further includes an application-side identifier, the application-side identifier being uniquely associated in memory with data stored by the reliability logic, the data unit generated by the reliability logic from the data to be stored.

Clause 37. The method of managing data in a distributed datastore system of clause 36, wherein the reliability logic is configured to generate the data unit, the data unit being operable to regenerate the data object using at least one other data unit associated in memory with the application-side identifier.

Clause 38. The method of managing data in a distributed datastore system of clause 35, wherein the data unit identifier includes a path to the data unit interpretable within the distributed datastore system.

Clause 39. The method of managing data in a distributed datastore system of one of clauses 34-38, wherein the identified at least one of the plurality of preconfigured operations includes migration of, replication of, error checking of, deduplication of, compression of, deletion of, modification of, or transmitting instructions to the reliability logic on behalf of the data unit.

Clause 40. The method of managing data in a distributed datastore system of one of clauses 34-39, further comprising: accessing, responsive to the operation of executing, a next data unit based on a sequential index of data units, the next data unit referenced in the sequential index immediately after a reference to the data unit.

Clause 41. A system for managing data in a distributed datastore network, the system comprising: One or more hardware processors; and a data visitor executable by the one or more hardware processors, the data visitor including: a metadata accessor executable by the one or more hardware processors and configured to access metadata uniquely associated in memory with a data unit stored in the distributed datastore network, wherein the metadata includes a state of the data unit and an operating policy including a plurality of preconfigured operations, the operating policy generated for the data unit by reliability logic in association with storage of the data unit; an operation identifier executable by the one or more hardware processors and configured to identify at least one of the plurality of preconfigured operations to be executed in association with the data unit based on a determination that the state of the data unit satisfies an operation condition specified in the operating policy; and an operation executer executable by the one or more hardware processors and configured to execute the identified at least one of the plurality of preconfigured operations.

Clause 42. The system for managing data in a distributed datastore network of clause 41, wherein the metadata includes an ordering metric representing: a time at which a storage request is made to store a data object from which the data unit is generated; or a time at which the reliability logic last a data unit identifier associated in memory with the data unit.

Clause 43. The system for managing data in a distributed datastore network of clause 42, wherein the metadata further includes an application-side identifier, the application-side identifier being uniquely associated in memory with data stored by the reliability logic, the data unit generated by the reliability logic from the data to be stored.

Clause 44. The system for managing data in a distributed datastore network of clause 43, wherein the reliability logic is configured to generate the data unit, the data unit being operable to regenerate the data object using at least one other data unit associated in memory with the application-side identifier.

Clause 45. The system for managing data in a distributed datastore network of clause 42, wherein the data unit identifier includes a path to the data unit interpretable within the distributed datastore network.

Clause 46. The system for managing data in a distributed datastore network of one of clauses 41-45, wherein the identified at least one of the plurality of preconfigured operations includes migration of, replication of, error checking of, deduplication of, compression of, deletion of, modification of, or transmitting instructions to the reliability logic on behalf of the data unit.

Clause 47. The system for managing data in a distributed datastore network of one of clauses 41-46, the data visitor further comprising: a next data unit accessor executable by the one or more hardware processors and configured to access, responsive to the execution, a next data unit based on a sequential index of data units, the next data unit referenced in the sequential index immediately after a reference to the data unit.

Clause 48. One or more tangible processor-readable storage media embodied with instructions for executing on one or more processors and circuits of a computing device a process of managing data in a distributed datastore system, the process comprising: accessing metadata uniquely associated in memory with a data unit stored in the distributed datastore system, wherein the metadata includes a state of the data unit and an operating policy including a plurality of preconfigured operations, the operating policy generated for the data unit by reliability logic in association with storage of the data unit; identifying at least one of the plurality of preconfigured operations to be executed in association with the data unit based on a determination that the state of the data unit satisfies an operation condition specified in the operating policy; and executing the identified at least one of the plurality of preconfigured operations.

Clause 49. The one or more tangible processor-readable storage media of clause 48, wherein the metadata includes an ordering metric representing: a time at which a storage request is made to store a data object from which the data unit is generated; or a time at which the reliability logic last modified a data unit identifier associated in memory with the data unit.

Clause 50. The one or more tangible processor-readable storage media of clause 49, wherein the metadata further includes an application-side identifier, the application-side identifier being uniquely associated in memory with data stored by the reliability logic, the data unit generated by the reliability logic from the data to be stored.

Clause 51. The one or more tangible processor-readable storage media of clause 50, wherein the reliability logic is configured to generate the data unit, the data unit being operable to regenerate the data object using at least one other data unit associated in memory with the application-side identifier.

Clause 52. The one or more tangible processor-readable storage media of clause 49, wherein the data unit identifier includes a path to the data unit interpretable within the distributed datastore system.

Clause 53. The one or more tangible processor-readable storage media of one of clauses 48-52, wherein the identified at least one of the plurality of preconfigured operations includes migration of, replication of, error checking of, deduplication of, compression of, deletion of, modification of, or transmitting instructions to the reliability logic on behalf of the data unit.

Clause 54. The one or more tangible processor-readable storage media of one of clauses 48-53, the process further comprising: accessing, responsive to the operation of executing, a next data unit based on a sequential index of data units, the next data unit referenced in the sequential index immediately after a reference to the data unit.

Clause 55. A system of managing data in a distributed datastore system, comprising: means for accessing metadata uniquely associated in memory with a data unit stored in the distributed datastore system, wherein the metadata includes a state of the data unit and an operating policy including a plurality of preconfigured operations, the operating policy generated for the data unit by reliability logic in association with storage of the data unit; means for identifying at least one of the plurality of preconfigured operations to be executed in association with the data unit based on a determination that the state of the data unit satisfies an operation condition specified in the operating policy; and means for executing the identified at least one of the plurality of preconfigured operations.

Clause 56. The system of managing data in a distributed datastore system of clause 55, wherein the metadata includes an ordering metric representing: a time at which a storage request is made to store a data object from which the data unit is generated; or a time at which the reliability logic last modified a data unit identifier associated in memory with the data unit.

Clause 57. The system of managing data in a distributed datastore system of clause 56, wherein the metadata further includes an application-side identifier, the application-side identifier being uniquely associated in memory with data stored by the reliability logic, the data unit generated by the reliability logic from the data to be stored.

Clause 58. The system of managing data in a distributed datastore system of clause 57, wherein the reliability logic is configured to generate the data unit, the data unit being operable to regenerate the data object using at least one other data unit associated in memory with the application-side identifier.

Clause 59. The system of managing data in a distributed datastore system of clause 56, wherein the data unit identifier includes a path to the data unit interpretable within the distributed datastore system.

Clause 60. The system of managing data in a distributed datastore system of one of clauses 55-59, wherein the identified at least one of the plurality of preconfigured operations includes migration of, replication of, error checking of, deduplication of, compression of, deletion of, modification of, or transmitting instructions to the reliability logic on behalf of the data unit.

Clause 61. The system of managing data in a distributed datastore system of one of clauses 55-60, further comprising: means for accessing, responsive to the execution, a next data unit based on a sequential index of data units, the next data unit referenced in the sequential index immediately after a reference to the data unit.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A method of operating on a data object stored in a distributed datastore system, comprising:
   determining, based on a data operation request specifying data stored in the distributed datastore system, a data object identifier associated with the specified data in the distributed datastore system;
   retrieving first system state data representing a state of the distributed datastore system at a first time associated with an initial generation of the data object identifier for storage of the data object;
   determining, based on the data operation request and the first system state data, at least one distributed datastore satisfying a predefined datastore condition, wherein the predefined datastore condition is based on availability of the at least one distributed datastore to store the specified data at the first time; and
   transmitting a query to the at least one distributed datastore to determine whether a data object generated from the specified data is stored on the at least one distributed datastore, based on satisfaction of the predefined datastore condition by the at least one distributed datastore.

2. The method of claim 1, further comprising:
   initially generating, based in part on a data storage request, the data object identifier based at least in part on a value of an ordering metric representing the first time;
   determining, based on an initial satisfaction of the predefined datastore condition, the at least one distributed datastore for storage of the data; and
   transmitting the data object to be stored to the at least one distributed datastore, the operation of determining the data object identifier being responsive to the operation of transmitting the data object.

3. The method of claim 2, wherein the operation of initially generating the data object identifier further comprises:
   combining input to generate the data object identifier, wherein the input includes the value of the ordering metric or an application-side identifier an application that generated the data operation request uses to identify the specified data.

4. The method of claim 1, wherein the predefined datastore condition further includes whether the at least one distributed datastore complies with a data policy, the data policy including whether the at least one distributed datastore satisfies a data operation performance requirement.

5. The method of claim 1, wherein the specified data is stored in the at least one distributed datastore as more than one data object including the data object, the data object identifier is one of a plurality of data object identifiers, and each of the more than one data object is uniquely associated in memory with a different one of the plurality of data object identifiers, the data object identifier identifying the data object uniquely among data object identifiers in the distributed datastore system.

6. The method of claim 5, wherein the more than one data object provide for reconstruction of a first of the more than one data object based at least on a second of the more than one data object different from the first of the more than one data object.

7. The method of claim 1, wherein the operation of determining the data object identifier further comprises:
   accessing an ordering metric representing the first time based on the data operation request; and
   regenerating the data object identifier based on the accessed ordering metric.

8. The method of claim 1, further comprising:
   determining, based on system state data associated with an ordering metric, that availability of datastores in the distributed datastore system satisfies an availability change condition, the ordering metric representing a second time later than the first time;
   generating, based on the ordering metric, a second data object identifier, responsive to the satisfaction of the availability change condition; and
   transmitting an instruction to associate in memory the data object with the second data object identifier.

9. The method of claim 1, wherein the operation of determining the data object identifier further comprises:
   determining that the at least one distributed datastore does not store a data object associated with the data object identifier; and
   transmitting a query, based on the data object identifier, to an active distributed datastore other than the at least one distributed datastore in the distributed datastore system to determine whether the data object is stored on the active distributed datastore.

10. A system for operating on a data object stored in a distributed datastore network, the system comprising:
    one or more hardware processors; and
    reliability logic, including:
      a data object identifier determiner executable by the one or more hardware processors and configured to determine, based on a data operation request specifying data stored in the distributed datastore network, a data object identifier associated with the specified data in the distributed datastore network;
      a system state data retriever executable by the one or more hardware processors and configured to retrieve first system state data representing a state of the distributed datastore network at a first time associated with an initial generation of the data object identifier for storage of the data object;
      a distributed datastore determiner executable by the one or more hardware processors and configured to determine, based on the data operation request and the first system state data, at least one distributed datastore satisfying a predefined datastore condition, wherein the predefined datastore condition is based on availability of the at least one distributed datastore to store the specified data at the first time; and
      a query transmitter executable by the one or more hardware processors and configured to transmit a query to the at least one distributed datastore to determine whether a data object generated from the specified data is stored on the at least one distributed datastore, based on satisfaction of the predefined datastore condition by the at least one distributed datastore.

11. The system of claim 10, wherein the data object identifier determiner is further configured to initially generate, based in part on a data storage request, the data object identifier based at least in part on a value of an ordering metric representing the first time and wherein the distributed datastore determiner is further configured to determine, based on an initial satisfaction of the predefined datastore condition, the at least one distributed datastore for storage of the data, the system further comprising:

a data transmitter executable by the one or more hardware processors and configured to transmit the data object to be stored to the at least one distributed datastore, the data object identifier determiner configured to determine the data object identifier responsive to the data transmitter transmitting the data object to be stored.

12. The system of claim 11, wherein the data object identifier determiner includes:

a data combiner executable by the one or more processors and configured to combine input to generate the data object identifier, wherein the input includes the value of the ordering metric or an application-side identifier an application that generated the data operation request uses to identify the specified data.

13. The system of claim 10, wherein the predefined datastore condition further includes whether the at least one distributed datastore complies with a data policy, the data policy including whether the at least one distributed datastore satisfies a data operation performance requirement.

14. The system of claim 10, wherein the specified data is stored in the at least one distributed datastore as more than one data object including the data object, the data object identifier is one of a plurality of data object identifiers, and each of the more than one data object is uniquely associated in memory with a different one of the plurality of data object identifiers, the data object identifier identifying the data object uniquely among data object identifiers in the distributed datastore network.

15. The system of claim 14, wherein the more than one data object provide for reconstruction of a first of the more than one data object based at least on a second of the more than one data object different from the first of the more than one data object.

16. One or more tangible non-transitory processor-readable storage media embodied with instructions for executing on one or more processors and circuits of a computing device a process of operating on a data object stored in a distributed datastore system, the process comprising:

determining, based on a data operation request specifying data stored in the distributed datastore system, a data object identifier associated with the specified data in the distributed datastore system;

retrieving first system state data representing a state of the distributed datastore system at a first time associated with an initial generation of the data object identifier for storage of the data object;

determining, based on the data operation request and the first system state data, at least one distributed datastore satisfying a predefined datastore condition, wherein the predefined datastore condition is based on availability of the at least one distributed datastore to store the specified data at the first time; and transmitting a query to the at least one distributed datastore to determine whether a data object generated from the specified data is stored on the at least one distributed datastore, based on satisfaction of the predefined datastore condition by the at least one distributed datastore.

17. The one or more non-transitory processor-readable storage media of claim 16, the process further comprising:

initially generating, based in part on a data storage request, the data object identifier based at least in part on a value of an ordering metric representing the first time;

determining, based on an initial satisfaction of the predefined datastore condition, the at least one distributed datastore for storage of the data; and transmitting the data object to be stored to the at least one distributed datastore, the operation of determining the data object identifier being responsive to the operation of transmitting the data object.

18. The one or more tangible non-transitory processor-readable storage media of claim 17, wherein the operation of initially generating the data object identifier further comprises:

combining input to generate the data object identifier, wherein the input includes the value of the ordering metric or an application-side identifier an application that generated the data operation request uses to identify the specified data.

19. The one or more tangible non-transitory processor-readable storage media of claim 16, wherein the predefined datastore condition further includes whether the at least one distributed datastore complies with a data policy, the data policy including whether the at least one distributed datastore satisfies a data operation performance requirement.

20. The one or more tangible non-transitory processor-readable storage media of claim 16, wherein the operation of determining the data object identifier further comprises:

accessing an ordering metric representing the first time based on the data operation request; and regenerating the data object identifier based on the accessed ordering metric.

* * * * *